(12) United States Patent  
Ebisu et al.

(10) Patent No.: US 7,552,463 B2
(45) Date of Patent: Jun. 23, 2009

(54) TELEVISION RECEIVER, RECEIVER AND PROGRAM EXECUTION METHOD

(75) Inventors: Koji Ebisu, Tokyo (JP); Ayumi Mizobuchi, Tokyo (JP); Kasumi Takeda, Tokyo (JP); Mami Uchida, Saitama (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 09/911,186

(22) Filed: Jul. 23, 2001

(65) Prior Publication Data

US 2002/0042925 A1    Apr. 11, 2002

(30) Foreign Application Priority Data

Jul. 24, 2000    (JP)    ............................. 2000-222176

(51) Int. Cl.
    *H04N 7/16*    (2006.01)
(52) U.S. Cl. ........................... 725/151; 725/38; 725/39; 725/51; 725/109; 725/110; 725/112
(58) Field of Classification Search ............... 725/51, 725/54, 59, 80, 32, 34, 50, 38, 39, 109, 110, 725/112
    See application file for complete search history.

(56) References Cited

U.S. PATENT DOCUMENTS

| 5,101,499 A | 3/1992 | Streck et al. |
| 5,410,326 A | 4/1995 | Goldstein |
| 5,410,343 A | 4/1995 | Coddington et al. |
| 5,467,341 A | 11/1995 | Matsukane et al. |
| 5,528,670 A * | 6/1996 | Elliot et al. ............. 379/88.25 |
| 5,563,648 A * | 10/1996 | Menand et al. ............ 725/142 |

(Continued)

FOREIGN PATENT DOCUMENTS

CN    1249644    4/2000

(Continued)

OTHER PUBLICATIONS

Vazquez-Cortizo D e al: "FS-aloha, a collision resolution algorithm with Qos support for the contention channel in multiservices wireless Lan" Global Communications Conference (GLOBECOM 99), vol. 5, Dec. 5, 1999, pp. 2773-2777, XP010373453.

(Continued)

*Primary Examiner*—John W Miller
*Assistant Examiner*—Sumaiya A Chowdhury
(74) *Attorney, Agent, or Firm*—Frommer Lawrence & Haug LLP; William S. Frommer; Thomas F. Presson

(57) ABSTRACT

A television receiver includes an LCD unit and an EEPROM in which broadcasting program selection information for controlling a tuner section and channel numbers are stored in a coordinated relationship and program-relating information for executing object processing programs and the channel numbers are stored in a coordinated relationship. A control section accepts a selective input of a channel number from a user through a key operation section and reads out information corresponding to the accepted channel number from the EEPROM. When the read out information is the broadcasting program selection information, the tuner section is controlled based on the information, but when the readout information is the program-relating information, a program corresponding to the program-relating information is executed.

29 Claims, 10 Drawing Sheets

U.S. PATENT DOCUMENTS

| | | | |
|---|---|---|---|
| 5,621,456 | A | 4/1997 | Florin et al. |
| 5,642,153 | A * | 6/1997 | Chaney et al. ................ 725/40 |
| 5,793,410 | A * | 8/1998 | Rao ........................... 725/120 |
| 5,802,467 | A | 9/1998 | Salazar et al. |
| 5,850,218 | A * | 12/1998 | LaJoie et al. ................... 725/45 |
| 5,862,339 | A | 1/1999 | Bonnaure et al. |
| 5,896,131 | A | 4/1999 | Alexander |
| 5,917,810 | A | 6/1999 | De Bot |
| 5,920,701 | A | 7/1999 | Miller et al. |
| 5,933,141 | A | 8/1999 | Smith |
| 5,949,432 | A | 9/1999 | Gough et al. |
| 6,002,394 | A * | 12/1999 | Schein et al. ................... 725/39 |
| 6,012,088 | A | 1/2000 | Li et al. |
| 6,028,600 | A | 2/2000 | Rosin et al. |
| 6,037,998 | A | 3/2000 | Usui et al. |
| 6,075,570 | A * | 6/2000 | Usui et al. .................... 725/49 |
| 6,097,441 | A | 8/2000 | Allport |
| 6,104,334 | A | 8/2000 | Allport |
| 6,263,503 | B1 | 7/2001 | Margulis |
| 6,396,523 | B1 | 5/2002 | Segal et al. |
| 6,417,869 | B1 | 7/2002 | Do |
| 6,469,633 | B1 | 10/2002 | Wachter |
| 6,470,497 | B1 * | 10/2002 | Ellis et al. ..................... 725/39 |
| 6,481,010 | B2 * | 11/2002 | Nishikawa et al. ............ 725/44 |
| 6,493,876 | B1 * | 12/2002 | DeFreese et al. ............ 725/100 |
| 6,510,556 | B1 * | 1/2003 | Kusaba et al. ................. 725/93 |
| 6,598,226 | B1 * | 7/2003 | Sorensen ..................... 725/56 |
| 6,670,970 | B1 | 12/2003 | Bonura et al. |
| 6,728,714 | B1 * | 4/2004 | Doganata et al. .............. 707/10 |
| 6,832,355 | B1 * | 12/2004 | Duperrouzel et al. ........ 715/788 |
| 2002/0073435 | A1 * | 6/2002 | Handelman ................. 725/122 |
| 2002/0078467 | A1 * | 6/2002 | Rosin et al. ................. 725/110 |
| 2004/0067766 | A1 | 4/2004 | Yamamoto |

FOREIGN PATENT DOCUMENTS

| | | |
|---|---|---|
| DE | 196 28 540 | 1/1998 |
| DE | 200 00 450 | 3/2000 |
| EP | 0 477 754 | 4/1992 |
| EP | 0 537 814 | 4/1993 |
| EP | 0 617 556 | 9/1994 |
| EP | 0 793 170 | 9/1997 |
| EP | 0 838 945 | 4/1998 |
| EP | 0 848 560 | 6/1998 |
| EP | 0 942 572 | 9/1999 |
| EP | 0 967 797 | 12/1999 |
| EP | 1 001 627 | 5/2000 |
| EP | 1 011 257 | 6/2000 |
| GB | 2 343 334 | 5/2000 |
| JP | 6 46270 | 2/1994 |
| JP | 8 16907 | 1/1996 |
| JP | 8 79740 | 3/1996 |
| JP | 8 102719 | 4/1996 |
| JP | 8 181988 | 7/1996 |
| JP | 9 74556 | 3/1997 |
| JP | 10 126771 | 5/1998 |
| JP | 10 257461 | 9/1998 |
| JP | 11 88419 | 3/1999 |
| JP | 11 136658 | 5/1999 |
| JP | 11 220665 | 8/1999 |
| JP | 11 298879 | 10/1999 |
| JP | 2000 183836 | 6/2000 |
| JP | 2000 197031 | 7/2000 |
| JP | 2001 86496 | 3/2001 |
| JP | 2001 313930 | 11/2001 |
| JP | 2002 41276 | 2/2002 |
| JP | 2002 57645 | 2/2002 |
| JP | 2002 84524 | 3/2002 |
| JP | 2002 116964 | 4/2002 |
| JP | 2002 185943 | 6/2002 |
| JP | 2002 191004 | 7/2002 |
| JP | 2002 271719 | 9/2002 |
| JP | 2002 305483 | 10/2002 |
| JP | 2002 312316 | 10/2002 |
| JP | 2002 328901 | 11/2002 |
| JP | 2002 344860 | 11/2002 |
| JP | 3092049 | 11/2002 |
| JP | 2002 354447 | 12/2002 |
| JP | 2003 18107 | 1/2003 |
| JP | 2003 37802 | 2/2003 |
| JP | 2003 46880 | 2/2003 |
| JP | 2003 108473 | 4/2003 |
| WO | WO 95 34168 | 12/1995 |
| WO | WO 98 59282 | 12/1998 |
| WO | WO 99 34564 | 7/1999 |
| WO | WO 99 34599 | 7/1999 |
| WO | WO 00 14919 | 3/2000 |
| WO | WO 01 35551 | 5/2001 |
| WO | WO 01 35585 | 5/2001 |
| WO | WO 02 056486 | 7/2002 |

OTHER PUBLICATIONS

"Wireless Medium Access Control (Mac) and Physical (Phy) Specifications" IEEE Standard 802.11-1997, XX,XX, 1997, pp. 71-99, XP002927753.

Gang Wu et al: "WinMac: a novel transmission protocol for infostations" Vehicular Technology Conference, 1999 IEEE 49TH Houston, TX, USA May 16-20, 1999, Piscataway, NJ, USA, IEEE, US, May 16, 1999, pp. 1340-1344, XP010342188, ISBN: 0-7803-5565-2.

Truman T et al: "The Infopad Multimedia Terminal: A Portable Device for Wireless Information Access" IEEE Transactions on Computers, IEEE Inc. New York, US, vol. 47, No. 10, Oct. 1, 1998, pp. 1073-1087, XP000781992.

Patent Abstracts of Japan, 2001-177478 dated Jun. 29, 2001.

* cited by examiner

FIG. 10

| CHANNEL NUMBER | FLG | SETTING INFORMATION |
|---|---|---|
| 1 | 0 TELEVISION BROADCAST SELECTION | FREQUENCY INFORMATION |
| 2 | 0 TELEVISION BROADCAST SELECTION | FREQUENCY INFORMATION |
| 3 | 0 TELEVISION BROADCAST SELECTION | FREQUENCY INFORMATION |
| ⋮ | ⋮ | ⋮ |
| 12 | 0 TELEVISION BROADCAST SELECTION | FREQUENCY INFORMATION |
| 13 | 1 EXTERNAL TERMINAL SELECTION | EXTERNAL TERMINAL INDICATION INFORMATION (EXTERNAL TERMINAL 1) |
| 14 | 1 EXTERNAL TERMINAL SELECTION | EXTERNAL TERMINAL INDICATION INFORMATION (EXTERNAL TERMINAL 2) |
| 15 | 2 PROGRAM EXECUTION | BROWSER   URL INPUT |
| 16 | 2 PROGRAM EXECUTION | MAIL INPUT |
| 17 | 2 PROGRAM EXECUTION | BROWSER   URL1 |
| 18 | 2 PROGRAM EXECUTION | BROWSER   URL2 |
| 19 | 2 PROGRAM EXECUTION | RECEPTION LIST |
| 20 | 2 PROGRAM EXECUTION | TRANSMISSION LIST |
| 21 | 2 PROGRAM EXECUTION | ALBUM PROGRAM |

F I G. 11
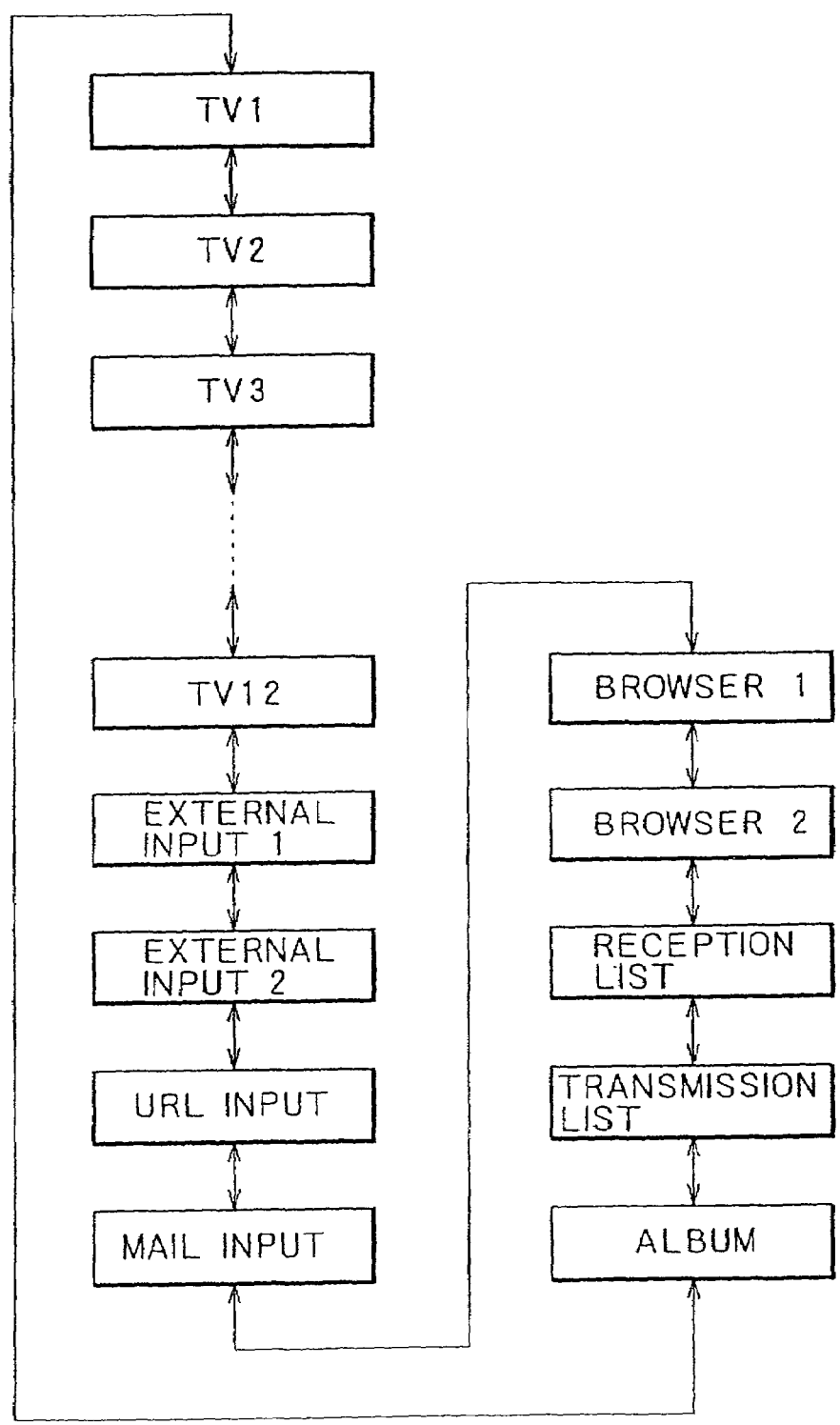

TELEVISION RECEIVER, RECEIVER AND PROGRAM EXECUTION METHOD

BACKGROUND OF THE INVENTION

This invention relates to a television receiver and a receiver which are electronic apparatus having a function of receiving and selecting a broadcasting signal and a program execution method for use with the electronic apparatus.

An electronic apparatus such as, for example, a television receiver can switch a channel by an operation of a channel up/down (+/−) key provided on a remote commander (hereinafter referred to as remote controller) provided for the television receiver. On the other hand, if it is intended to cause the television receiver to process a signal from an external inputting apparatus such as a video tape recorder (VTR) connected thereto, the signal to be processed can be switched by depressing an input switching key.

SUMMARY OF THE INVENTION

To easily utilize information (contents) of a web page or the like provided on the Internet in addition to an ordinary television broadcasting program, an internet television receiver is available which includes a communication apparatus such as a modem and can be connected to the Internet over a telephone line so that information of a web page and so forth can be enjoyed through a display screen of the television receiver.

The Internet television receiver includes a switching key for exclusive use for switching from playback of a television broadcasting program to connection to the Internet. A user of the Internet television receiver can use the switching key for exclusive use to start a program for connection to the Internet so that the Internet television receiver may be connected to the Internet thereby to allow the user to utilize various information provided on the Internet. An electronic apparatus which can be connected to the Internet and in which a browser which is a browsing program to a web page provided through the Internet is installed, such as an Internet television receiver, a personal computer, a set-top box (STB) and an integrated receiver decoder (IRD) has a function of registering web pages, which are accessed frequently, so that a target web page can be accessed quickly any time. Registration or display of a web page which is accessed frequently can be performed by performing a predetermined operation for the electronic apparatus such as an operation of a key or button switch for exclusive use provided on the electronic apparatus.

In this manner, in an electronic apparatus such as a television receiver or a receiver, keys for exclusive use not only for channel selection but also for various processes performed frequently such as switching of an external input, connection to the Internet, and registration or display of a web page which is accessed frequently are provided on a remote controller for the electronic apparatus or a key operation section of the electronic apparatus so that an intended process can be executed by a comparatively simple operation. However, if a user intends to play back and enjoy a signal from a VTR with and on a television receiver as described above, then the user must operate the input switching key on a remote controller or the like for the television receiver so that a signal from an external inputting apparatus may be accepted by the television receiver. Further, in the Internet television receiver described above, if it is intended to display information acquired from the Internet, then a predetermined operation such as an operation of a key for exclusive use must be performed.

However, if the user does not understand an operation method of a television receiver or an Internet television receiver to be used such as from where information to be enjoyed can be acquired or how such information can be played back and a construction relating to the operation method, then the user cannot sometimes perform a predetermined operation. In this manner, a conventional electronic apparatus requires a user to recognize a screen to be observed or what should be performed and perform a predetermined operation such as an operation of a key for exclusive use. Therefore, a user who does not understand the construction well may sometimes feel that it is difficult even to have object information displayed on a display screen of a television receiver.

The present invention provides a television receiver, comprising selectors for receiving television broadcasting signals and selecting one of the television broadcasting signals, a display element for displaying a video based on a video signal of the television broadcasting signal selected by the selector, a storage device for storing program selection information to be used to control the selector and channel numbers in a coordinated relationship and storing program-relating information to be used for execution of object processing programs and the channel numbers in a coordinated relationship, an acceptance device for accepting a selective input of a channel number from a user, readout device for reading out information corresponding to the channel number accepted by the acceptance device from the storage device, selection control device for controlling, when the information read out by the readout device is the program selection information, the selection device based on the program selection information, and program execution device for executing, when the information read out by the readout device is the program-relating information, a program in response to the program-relating information.

In the television receiver, program selection information to be used to control the selector and channel numbers are stored in a coordinated relationship and program-relating information to be used for execution of object processing programs and the channel numbers are stored in a coordinated relationship in the storage device. If a selective input of a channel number is accepted by the acceptance device, then information corresponding to the accepted channel number is read out from the storage device by the readout device. Then, if the information read out is the program selection information, then the selection device is controlled based on the program selection information by the selection control device. On the other hand, when the information read out is the program-relating information, a program is executed in response to the program-relating information by the program execution device. The acceptance device may include channel up/down keys for accepting selective inputs of the channel number in forward and reverse directions, respectively.

With the television receiver, selection of a channel number can be performed successively in the forward or reverse direction by device of the channel up or down key. Consequently, by a simple operation of operating the channel up or down key, a program coordinated with a channel number can be executed and utilized through an operation quite similar to an ordinary operation for channel selection of a television broadcasting program. The program-relating information coordinated with at least one of the channel numbers may relate to a processing program which can be executed by the television receiver itself. In the television receiver, the program-relating information stored in a coordinated relationship with at least one of the channel numbers in the storage device is used to execute a processing program which can be executed on the television receiver. The program-relating information may be, for example, information of a program name for execution of any of various programs such as a word processor program or a game program. Thus, by an operation of selecting a channel number which is familiar to a user, various programs which can be executed on the television receiver can be executed and utilized through a simple operation.

The television receiver may further comprise communication device for connecting the television receiver to a communication network, and may be constructed such that the program-relating information coordinated with at least one of the channel numbers relates to a program to be executed to allow at least the television receiver to transmit or receive information through the communication device. In the television receiver, the program-relating information stored in a coordinated relationship with at least one of the channel numbers in the storage device is a program used to transmit or receive information through the communication device and may be information of, for example, a program name of a viewer program called browser for allowing accessing to a web page or a program name of a processing program relating to an electronic mail called mailer for processing information of a telephone number and so forth of an ISP (Internet Service Provider) and allowing preparation, transmission and reception an electronic mail to be performed. Thus, by an operation of selecting a channel number which is familiar to a user, the television receiver can be connected to a communication network through the communication device to receive or transmit information simply.

The television receiver may be constructed such that it further comprises communication device for connecting the television receiver to a communication network, and received information storage device for storing received information received through the communication device, and the program-relating information coordinated with at least one of the channel numbers relates to a program to be executed to cause at least display information of the received information stored in the received information storage device to be displayed on the display element. The television receiver can be connected to a communication network such as, for example, the Internet through the communication device. Received information such as, for example, a web page or an electronic mail received by the communication device can be stored into the received information storage device. Then, the program-relating information stored in a coordinated relationship with at least one of the channel numbers in the storage device is used to execute a program for causing at least display information of the received information stored in the received information storage device to be displayed on the display element. More particularly, where the information stored in the received information storage device and to be outputted is information of a web page, the program-relating information includes a program name of a viewer program called browser or the like for allowing accessing to a web page and information of a URL (Uniform Resource Locator) and so forth of a web page to be accessed. On the other hand, where the information stored in the received information storage device and to be outputted is a received electronic mail, the program-relating information is information of a program name of a display program for displaying a list of received electronic mails and so forth. Consequently, by an operation of selecting a channel number which is familiar to a user, information acquired from the communication network can be displayed and utilized on the display element simply, and information can be received or transmitted simply the communication network.

The television receiver may be constructed such that it further comprises communication device for connecting the television receiver to a communication network, and transmission information storage device for storing transmission information to be transmitted through the communication device, and that the program-relating information coordinated with at least one of the channel numbers relates to a program to be executed to cause at least display information of the transmission information stored in the transmission information storage device to be displayed on the display element. The television receiver can be connected to a communication network such as, for example, the Internet through the communication device. Transmission information such as, for example, an electronic mail to be transmitted through the communication network can be stored into the transmission information storage device. Then, the program-relating information stored in a coordinated relationship with at least one of the channel numbers in the storage device is information used to execute a program for causing at least display information of the transmission information stored in the transmission information storage device to be displayed on the display element. More particularly, where the information stored in the transmission information storage device and to be outputted is an electronic mail prepared to be transmitted, the program-relating information includes a program name of a display program for allowing a list of prepared electronic mails to be displayed. Consequently, by an operation of selecting a channel number which is familiar to a user, information to be transmitted to the other party through the communication network can be displayed and utilized on the display element simply. Further, a prepared electronic mail can be transmitted simply through the communication network.

The television receiver may be constructed such that it further comprises display information storage device for storing display information to be displayed on the display element, and that the program-relating information coordinated with at least one of the channel numbers relates to a program to be executed to cause at least a video corresponding to the display information stored in the display information storage device to be displayed on the display element. In the television receiver, display information such as, for example, image data or text data is stored in the display information storage device. Then, the program-relating information stored in a coordinated relationship with at least one of the channel numbers in the storage device is information used to execute a program for causing the display information stored in the display information storage device to be displayed on the display element. More particularly, the program-relating information is information for allowing execution of an album program which is an application program for outputting still image data stored in the display information storage device, a word processor program for outputting text data stored in the display information storage device or a spreadsheet program for outputting data stored in the display information storage device. Thus, by an operation of selecting a channel number which is familiar to a user, various kinds of information stored in the display information storage device can be displayed and utilized on the display element.

The television receiver may further comprise instruction input acceptance device for accepting a display instruction input of a list of the information stored in the storage device, and list display signal formation device for forming, when an instruction to display the list is accepted by the instruction input acceptance device, a displaying signal for displaying the list of the information stored in the storage device on the display element. In the television receiver, if an instruction input to display a list is accepted by the instruction input acceptance device, then a displaying signal for displaying a list of the information stored in the storage device is formed by the list display signal formation device and supplied to the display element. Consequently, a channel list which is a list of the information stored in the storage device is displayed on the display element. Therefore, the user can confirm channel numbers used and information coordinated with the channel number and select an object channel number with certainty.

In this instance, the television receiver may be constructed such that it further comprises touched position detection device provided on a display screen of the display element for detecting a touched position of the display screen touched by a user, and that the readout device uses a channel number corresponding to a display item of the list displayed at the touched position of the display screen detected by the touched position detection device as a channel number selected by the user. In the television receiver, if the user touches the touched position detection device provided on the display screen of the display element with its finger or the like, then the touched position is detected, and a channel number corresponding to a display item of the list displayed on the display screen of the display element and corresponding to the touched position is selected. Consequently, a selection operation of a channel number from the user can be accepted by device of the list displayed on the display element and the touched position detection device. In this instance, the user can select an object channel number to change a selected broadcasting signal or execute a program for performing an object process by a simple operation. Preferably, the program execution device executes the program from a process which was being executed upon switching from a channel number to which the program is allocated to another channel number.

In the television receiver, the program-relating information includes, for example, information of an execution condition of a program when the channel number is switched. Then, if a channel number which has been selected in the past and with which program-relating information is coordinated is selected through the acceptance device, then the program execution device executes the program from a process which was being executed upon the switching of the channel number. For example, if the channel number is switched during preparation of an electronic mail in order to enjoy a television broadcasting program or the like and then the channel number is switched back to channel number to which an electronic mail preparation process is allocated, then the screen display returns to that during the preparation of an electronic mail thereby to allow the preparation of the electronic mail to be continued. Consequently, an interrupted process can be continued readily from the interrupted portion without performing a complicated operation.

In summary, with the television receiver, an object process can be executed by a simple operation of operating the channel up key or down key. Accordingly, even if a user of the television receiver cannot find a button switch for exclusive use for displaying an object screen, any desired display screen can be switchably displayed only by operating the channel up key or down key. Consequently, anyone from a child to an aged person can operate the television receiver. Further, even if a user has not used the Internet as yet, the user can execute a browser program readily and can execute an object program through a web browser to utilize the Internet without being aware of the browser. Further, since object information can be read out directly from a channel list displayed on the television receiver, an object process can be executed rapidly from a channel.

BRIEF DESCRIPTION OF THE DRAWINGS

The following description, given by way of example and not intended to limit the present invention solely thereto, will best be understood by referring to the accompanying drawings, in which:

FIG. 10 is a view illustrating a selection channel setting information table;

FIG. 11 is a flow diagram illustrating a rotation of selection channels which can be performed on the television receiver shown in FIG. 1;

DETAILED DESCRIPTION OF CERTAIN PREFERRED EMBODIMENTS

Figure 1:
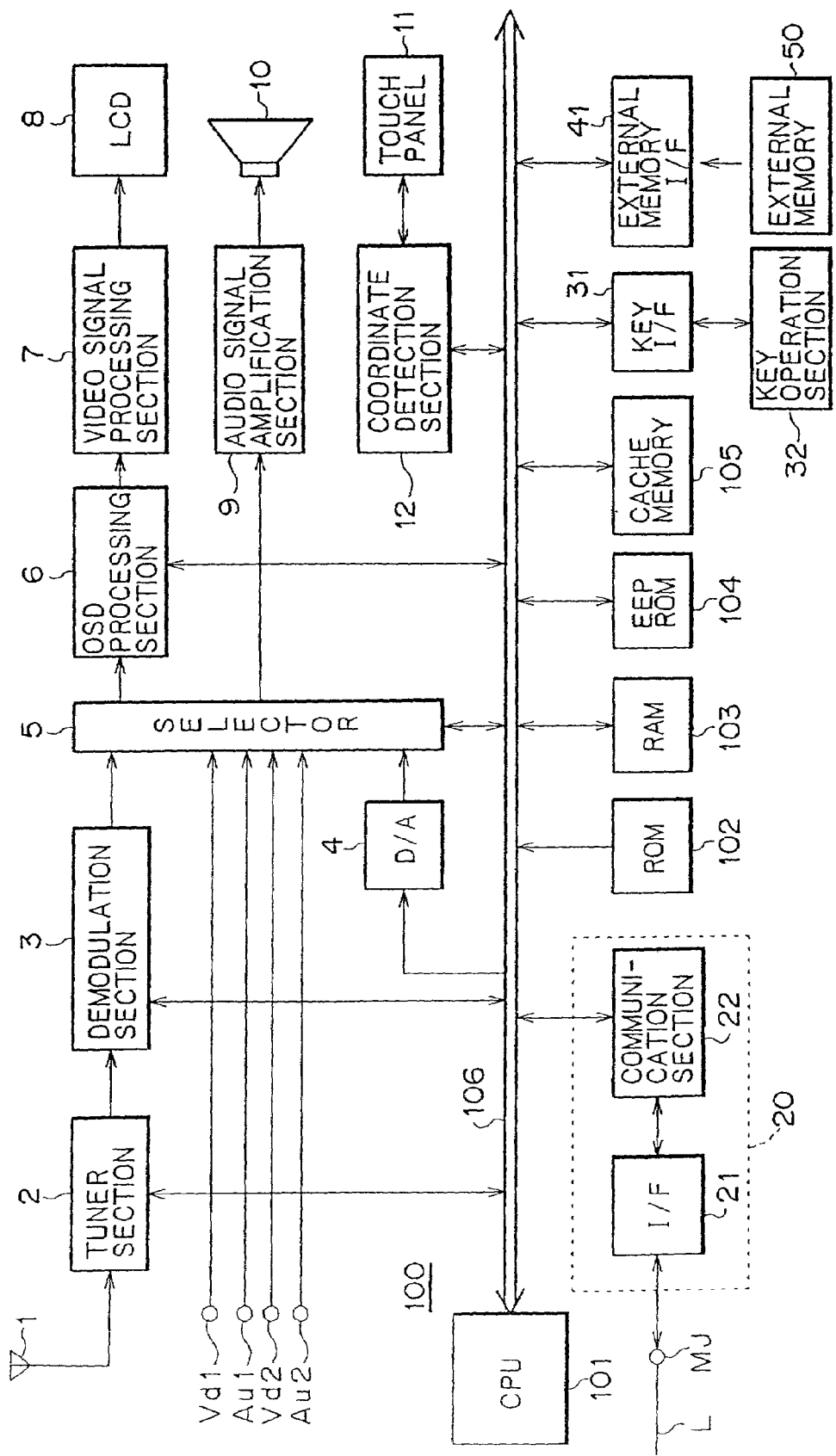
FIG. 1 is a block diagram of a television receiver to which the present invention is applied.

FIG. 1 shows the television receiver of the present embodiment. Referring to FIG. 1, the television receiver includes a tuner section 2 connected to a reception antenna 1 located outdoors for receiving analog television broadcasting signals of ground waves, a demodulation section 3, input terminals Vd1 and Vd2 for a video signal, input terminals Au1 and Au2 for an audio signal, a D/A conversion section 4, a selector 5, an on-screen display (OSD) processing section 6, a video signal processing section 7, a liquid crystal display (LCD) unit 8, an audio signal amplification section 9, a speaker 10, a touch panel 11, and a coordinate detection section 12.

The components of the television receiver are controlled by a control section 100. The control section 100 is formed as a microcomputer which includes a central processing unit (CPU) 101, a read only memory (ROM) 102, a random access memory (RAM) 103, an electrically erasable programmable read only memory (EEPROM) 104 and a cache memory 105 all connected to each other by a CPU bus 106. The ROM 102 has stored therein various programs which are executed by the television receiver and data necessary for processing of the television receiver. The RAM 103 is used as a working area for various processes such as for temporarily storing data obtained by various processes. The EEPROM 104 is a nonvolatile memory and keeps its stored information even if the power supply thereto is turned off. For example, frequency information included in channel selection control information to be supplied to the tuner section 2 and other various parameter information.

A modem section 20 is connected to the control section 100. The modem section 20 includes an interface I/F) section 21 and a communication section 22. The interface section 21 in the present embodiment is an interface between a telephone circuit and the television receiver and is used to receive a signal transmitted thereto over the telephone circuit and transmit a signal from the television receiver to the telephone circuit. The communication section 22 demodulates a signal received through the interface section 21 and supplies the demodulated signal to the control section 100. Further, the communication section 22 modulates a transmission signal from the control section 100 and supplies the modulated transmission signal to the interface section 21. Consequently, the television receiver can transmit and receive various data to and from the other party to whom the telephone circuit is connected. It is to be noted that reference character L in FIG. 1 denotes a telephone line led in from a telephone network, and MJ denotes a connection terminal (modular jack) to the telephone line L.

The television receiver can be connected to the Internet through the modem section 20, the telephone line L and a predetermined Internet service provider (ISP) so that it can receive various kinds of information (contents) provided through the Internet and transmit or receive an electronic mail. To this end, the control section 100 can control the modem section 20 to establish an off-hook state or an on-hook state. The control section 100 further has a function as a dialer of signaling, when it controls the modem section 20 to establish an off-hook state, a dial number to the telephone circuit. In this manner, the television receiver has a function for connecting the television receiver itself to a communication network such as a telephone network or the Internet and can receive supply of information or transmit information to an object party through the communication network. The cache memory 105 connected to the control section 100 can store, for example, provided information such as a web page acquired through the communication network, a received electronic mail, an electronic mail transmitted or to be transmitted, and other information. Thus, when necessary, the stored information can be read out from the cache memory 105 and utilized.

A key operation section 32 is connected to the control section 100 through a key interface (key I/F) 31. The key operation section 32 accepts key operations from a user. In the television receiver, key operations for instruction of on/off of the power supply, up/down of the selection channel, up/down of the sound volume, displaying of a channel table (index table) which is hereinafter described and so forth can be performed by the key operation section 32. Further, a removable external memory (external semiconductor memory) 50 can be connected to the control section 100 through an external memory interface (hereinafter referred to as external memory I/F) 41. The control section 100 of the television receiver can write and store data or a program into and in the external memory 50 connected thereto through the external memory I/F 41 and read out and utilize such data or program written in the external memory 50. Thus, the external memory I/F 41 has a slot portion into and from which the external memory 50 can be loaded and unloaded, and has a function of writing data into the external memory 50 and another function of reading out data from the external memory 50. Thus, the external memory I/F 41 allows transmission and reception of data between the external memory 50 connected to the external memory I/F 41 and the control section 100 of the television receiver.

Now, operation of the television receiver is described. In the present embodiment, television broadcasting signals received by the reception antenna 1 shown in FIG. 1 are supplied to the tuner section 2 of the television receiver. The tuner section 2 selects one of the television broadcasting signals from the reception antenna 1 in response to a channel selection instruction signal from the control section 100 and supplies the selected television broadcasting signal to the demodulation section 3. The demodulation section 3 demodulates the television broadcasting signal supplied thereto and supplies the signal after the demodulation to the selector 5.

Video signals supplied through the input terminals Vd1 and Vd2 for a video signal and audio signals inputted through the input terminals Au1 and Au2 for an audio signal are supplied to the selector 5. Also information from the control section 100 is supplied to the selector 5 through the D/A conversion section 4. The information supplied from the control section 100 to the selector 5 includes, for example, information of a web page laid open on the Internet and information of an electronic mail, fetched through the modem section 20. The selector 5 switches, in response to a switching control signal from the control section 100, whether a signal from the demodulation section 3 is outputted, whether signals from the external input terminals Vd1 and Au1 from between the two systems of output input terminals are outputted or signals from the external input terminals Vd2 and Au2 are outputted or whether a signal from the control section 100 is outputted. The switching control signal supplied from the control section 100 to the selector 5 is formed by the control section 100 in response to an operation input from a user.

An output video signal from the selector 5 is supplied to the OSD processing section 6 while an output audio signal from the selector 5 is supplied to the audio signal amplification section 9. The OSD processing section 6 performs video signal processing for displaying various messages in response to data supplied thereto from the control section 100, and is a text/graphic processing circuit for allowing displaying of display information of characters, pictures, symbols and so forth other than a video of a broadcasting program. For example, in order to display character information representative of a channel to be selected, a sound volume bar representative of a sound volume level or the like in response to an instruction from the user, information necessary for displaying the information is supplied from the control section 100 to the OSD processing section 6. Then, the display information from the control section 100 is synthesized with the video signal from the selector 5, and a resulting signal is supplied to the video signal processing section 7.

When display information such as message information need not be synthesized, since no display information is supplied from the control section 100 to the OSD processing section 6, the video signal from the selector 5 is supplied as it is to the video signal processing section 7. The video signal processing section 7 forms a displaying signal from the video signal supplied thereto through the OSD processing section 6 and supplies the displaying signal to the LCD unit 8. Consequently, a video corresponding to the video signal from the selector 5 is displayed on the display screen of the LCD unit 8. In this instance, when display information such as message information is synthesized by the OSD processing section 6, the display information such as message information is synthesized with the video signal from the selector 5. Consequently, a video based on the video signal from the selector 5 and the message information are displayed.

The audio signal amplification section 9 amplifies an audio signal supplied thereto to a predetermined level and supplies the amplified audio signal to the speaker 10. Consequently, sound corresponding to the audio signal outputted from the selector 5 is emitted from the speaker 10. In this manner, the television receiver of the present embodiment can display a television broadcasting signal provided in the form of an analog television signal of a ground wave and information of a web page or an electronic mail acquired from the communication network through the input terminals Vd1 and Au1 or the input terminals Vd2 and Au2, or the modem section 20 on the display screen of the LCD unit 8.

In the television receiver, the touch panel 11 is adhered to the display screen of the LCD unit 8. Thus, if a user touches the touch panel 11 with its finger or the like, then the touch panel 11 and the coordinate detection section 12 cooperatively detect the touched position of the touch panel 11 (the coordinate position of the display screen) and conveys the detected position to the control section 100.

The television receiver can use display information to be displayed on the LCD unit 8 of the television receiver itself and the touch panel 11 to accept an operation input from the user.

For example, in order to prepare and transmit an electronic mail to an object party, the user can perform a predetermined operation to display a so-called software keyboard, which includes alphabetical keys, the Japanese syllabary keys and so forth to be used for preparation of an electronic mail, on the display screen of the LCD unit 8, accepts an operation input from the user through the display and the touch panel 11 to prepare an electronic mail to be transmitted, and transmit the electronic mail through the modem section 20.

Figure 2:
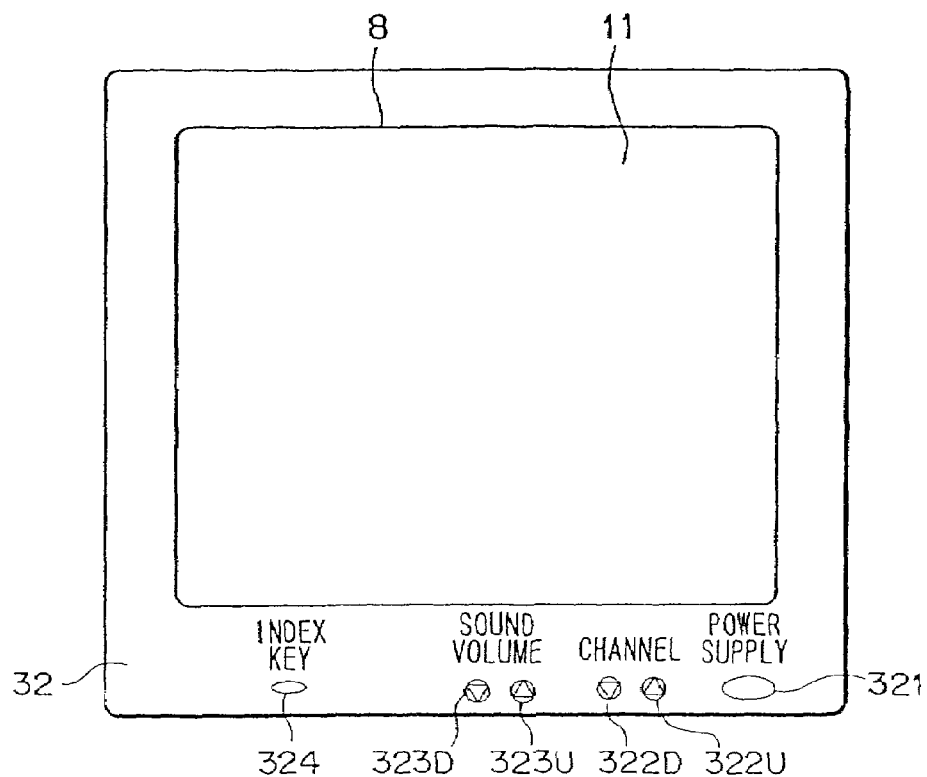
FIG. 2 is a schematic view showing an appearance of the television receiver shown in FIG. 1.

FIG. 2 shows an appearance of the television receiver of the present embodiment as viewed from the side opposing to the LCD unit 8 of the television receiver. As seen from FIG. 2, the key operation section 32 including various operation keys is provided below the display screen of the television receiver. The key operation section 32 provided below the LCD unit 8 of the television receiver includes a power supply on/off key 321, an up key 322U and a channel key 322D for channel selection, and an up key 323U and a down key 323D for sound volume adjustment.

The key operation section 32 of the television receiver further includes an index key 324 for causing a channel table (index table), which is hereinafter described, to be displayed. Further, as seen in FIG. 2, the touch panel 11 is adhered to the display screen of the LCD unit 8 of the television receiver such that it can be touched with a finger of a user, a touch pen or the like. Thus, the television receiver can accept inputting of various kinds of information from a user through display information displayed on the display screen of the LCD unit 8 and the touch panel 11.

The television receiver allows setting of broadcasting program selection information for selecting a broadcasting program (broadcasting channel) to a selection channel selected by a user similarly as in a conventional television receiver. Broadcasting waves to be received and selected in the present embodiment are analog television broadcasting signals of ground waves, and as the broadcasting program selection information, such frequency information for selection of an analog television broadcasting signal is used as will be described hereinafter. On the television receiver, it is possible to register an external input terminal, to which an external input apparatus is to be connected, in a coordinated relationship with a selection channel number and to set a web page to be acquired through the Internet or information (program-relating information) relating to a program to be executed in order to utilize a transmission list or a reception list for electronic mails.

On the television receiver, when the power supply on/off key 321 is depressed first after the television receiver is purchased, various kinds of setting regarding channel setting regarding television broadcasts, channel setting regarding external input terminals, and channel setting regarding the Internet and various kinds of setting regarding an electronic mail (E-mail) can be performed successively. In particular, if the power supply on/off key 321 of the television receiver is depressed to connect the power supply before the user does not perform channel setting after the television receiver is purchased, then the control section 100 first causes a channel setting screen for television broadcasts to be displayed to urge the user to perform channel setting for television broadcasts.

The user will thus successively select a channel number and a broadcasting wave (broadcasting channel) to be coordinated with the channel number in accordance with the channel setting screen for television broadcasts to set object broadcasting waves to respective channel numbers, in the present embodiment, channel numbers 1 to 12. Consequently, in the television receiver of the present embodiment, the channel numbers and frequency information for selecting the broadcasting waves set in a coordinated relationship with the individual channels (in the present embodiment, frequency dividing ratios to be supplied to a PLL circuit for channel selection provided in the tuner section 2) are set in a coordinated relationship with each other to the EEPROM 104.

The television receiver includes two systems of external input terminals so that the external input terminals to which external inputting apparatus are to be connected are coordinated with channel numbers next to the channel numbers 1 to 12 with which the television broadcasting waves are coordinated. In the television receiver, the input terminal Vd1 for a video signal and the input terminal Au1 for an audio signal are coordinated with the channel number 13, and the input terminal Vd2 for a video signal and the input terminal Au2 for an audio signal are coordinated with the channel number 14.

In the television receiver, a selection operation of a channel number in the channel presetting processing described above, a switching instruction operation of a broadcasting wave to be selected and a settling operation of a broadcasting wave to be set can be performed by a user touching, with its finger or the like, a position of the touch panel 11 adhered to the LCD unit 8 at which display information corresponding an operation key displayed on the LCD unit 8 is displayed. In short, a touched position on the touch panel 11 is detected by the coordinate detection section 12 and conveyed to the control section 100, and the control section 100 performs processing based on the display information displayed at the touched position.

After such channel setting for television broadcasts and channel setting for the external output terminals are completed, the control section 100 causes a setting screen regarding the Internet to be displayed to urge the user to perform various settings regarding the Internet. On the setting screen for the Internet, setting of various kinds of information necessary for connection to the Internet such as, for example, a telephone number of an ISP, a personal identification number, a URL and a transmission rate can be performed.

If the user performs setting of an ISP and so forth through the setting screen regarding the Internet, then activation of a browser for connection to the Internet is allocated to a free channel, in the present embodiment, a channel next to the channels allocated to the external input terminals, and is set to the EEPROM 104. Also the information of the telephone number of the ISP, the personal identification number, the transmission rate and so forth is set to the EEPROM 104. After such setting regarding the Internet is completed, the control section 100 causes a setting screen for an electronic mail to be displayed to urge the user to perform various settings regarding an electronic mail. On the setting screen regarding an electronic mail, setting of various kinds of information necessary to transmit or receive an electronic mail such as, for example, a telephone number of an ISP to be used for transmission or reception of an electronic mail can be performed. If the user performs necessary setting through the setting screen for an electronic mail, then activation of a processing program regarding an electronic mail for connection to an object party of an electronic mail is allocated to a free channel, in the present embodiment, a channel next to the channel allocated to the Internet, and is set to the EEPROM 104. Also the information regarding the telephone number of the ISP is set to the EEPROM 104.

Through this processing, a browser name and a processing program name regarding an electronic mail are allocated to the individual channels and set to a channel setting information table which is hereinafter described. Consequently, only if the channel up key 322U or the channel down key 322D is operated, not only selection of a broadcasting program but also switching to an external input terminal, activation of the browser for connection to the Internet, and activation of the processing program regarding an electronic mail for preparing, transmitting or receiving an electronic mail can be performed. In other words, even if a key for exclusive use such as an external input switching key is not operated, if the channel up key or the channel down key is operated to select the channel number 13 or the channel number 14, then the signal to be processed by the television receiver can be switched to signals from an external inputting apparatus connected to the external input terminals Vd1 and Au1 or the external input terminals Vd2 and Au2 provided on the television receiver. Further, even if a key for exclusive use such as an Internet key or an electronic mail key is not operated, it is possible, by operating the channel up key or the channel down key, to activate the browser to access the Internet or activate the processing program for an electronic mail to perform preparation, transmission or reception of an electronic mail in the same feeling as in changing the television channel.

Information to be used commonly upon connection to the Internet such as. a telephone number of an ISP, a personal identification number and a data transmission rate is set, for example, to a common information setting table separately from information of the channel setting information table, and upon connection to the Internet, the information of the common information setting table is referred to and used.

The television receiver can not only allocate activation of a browser to a channel to activate the browser to access a predetermined ISP and allocate activation of a processing program for an electronic mail to a channel to perform preparation, transmission or reception of an electronic mail, but also allocate a transmission list or a reception list of electronic mails, a folder produced or an accessed web page to a channel.

Figure 3:
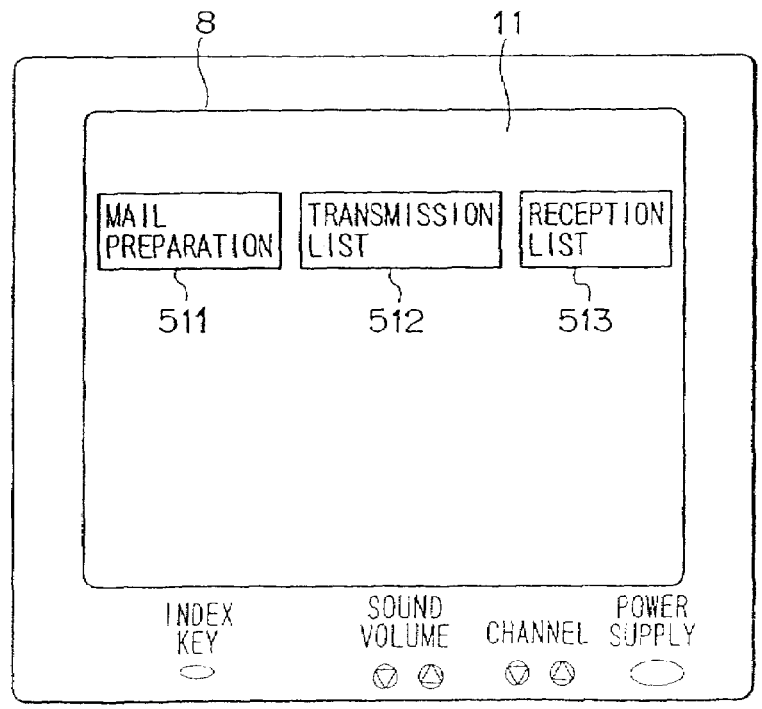
FIG. 3 is a similar view but showing an initial screen in a process regarding an electronic mail displayed on an LCD of the television receiver shown in FIG. 1.

First, setting of a transmission list and a reception list to a channel is described. Since activation of the processing program for an electronic mail is set in a coordinated relationship with a channel as described hereinabove, the processing program for an electronic mail can be activated by a channel selection operation by operating the channel up key 322U or the channel down key 322D. If activation of the processing program for an electronic program is selected by operating the channel up key 322U or the channel down key 322D, then the control section 100 of the television receiver reads out the processing program for an electronic mail from the ROM 102 and executes the processing program so as to enable processing of an electronic mail. In other words, the control section 100 establishes an electronic mail mode. If the processing program for an electronic mail is executed by the television receiver, then the control section 100 causes an initial screen for processing of an electronic mail to be displayed using the information stored in the ROM 102. FIG. 3 illustrates the initial screen for processing of an electronic mail displayed on the LCD unit 8 of the television receiver.

Referring to FIG. 3, the initial screen includes display of a mail preparation ion 511 for indicating execution of a mail preparation process, a transmission list icon 512 for executing a process regarding the transmission list in which prepared electronic mails are stored, and a reception list icon 513 for executing reception of an electronic mail destined for the user and processing of the received electronic mail. Then, if the user of the television receiver touches the touch panel 11 corresponding to a displayed position of an icon of an object process with its finger or a touch pen to select the object process, then the control section 100 of the television receiver discriminates the process selected by the user from the touched position of the touch panel 11 touched by the user and the displayed positions of the icons, and executes the selected process. If the mail preparation ion 511 on the initial screen for processing of an electronic mail shown in FIG. 3 is selected by the user, then the control section 100 of the television receiver executes an electronic mail preparation processing program. In this instance, the control section 100 controls the LCD unit 8 to display an electronic mail preparation screen using font information and other necessary information stored in the ROM 102.

Figure 4:
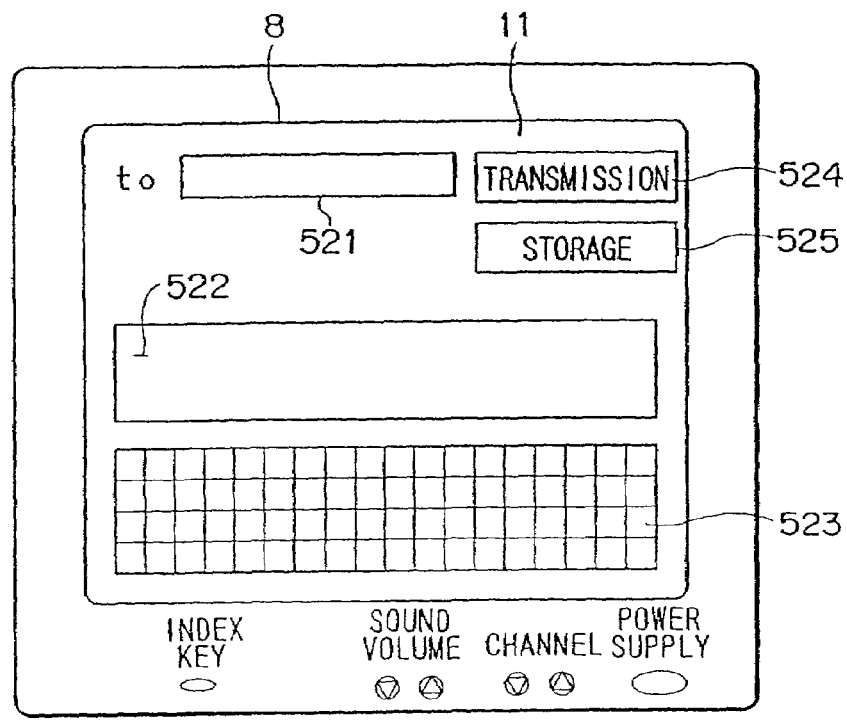
FIG. 4 is a similar view but showing a screen for preparation of an electronic mail displayed on the LCD of the television receiver shown in FIG. 1.

FIG. 4 shows the electronic mail preparation screen used by the television receiver of the present embodiment. Referring to FIG. 4, the electronic mail preparation screen used by the television receiver of the present embodiment includes display of a mail address inputting column 521 for a transmission destination, an inputting column 522 for an electronic mail text, a so-called software keyboard 523 for inputting a character corresponding to a touched position, a transmission icon 524 for designating transmission of a prepared electronic mail, and a storage icon 525 for designating storage of a prepared electronic mail into the transmission list.

In the television receiver, if a user touches an input column for information to be inputted with its finger or the like, then inputting of information to the input column is enabled. Thus, the user will input a mail address and a mail text through the software keyboard 523 to produce an electronic mail to be transmitted to an object party. It is to be noted that, as the software keyboard 523 to be displayed on the LCD unit 8, a Japanese cursive kana character inputting software keyboard, a Japanese katakana inputting software keyboard and an alphabet inputting software keyboard and so forth are prepared in advance such that one of such software keyboards can be selectively used by the user.

If the transmission icon 524 displayed at the right upper corner of the display screen in FIG. 4 is selected when the preparation of an electronic mail is completed, then the control section 100 controls the modem section 20 using the telephone number of the ISP and the personal identification number (password) of itself stored in advance in the EEPROM 104 so that a telephone circuit is connected to the ISP. If the control section 100 of the television receiver is informed by the modem section 20 that a telephone circuit is connected, then it transmits a mail address of the transmission destination of the electronic mail and the text of the electronic mail to the mailbox of a server of the object party. Consequently, after an electronic mail is prepared, it can be transmitted immediately to a mailbox of the object party through the Internet. Then, after the transmission is completed, the electronic mail preparation screen shown in FIG. 4 is restored so that preparation of a new electronic mail can be performed.

In the television receiver, if the storage icon 525 displayed at the right upper corner of the electronic mail preparation screen shown in FIG. 4 is selected, then the control section 100 stores the electronic mail prepared in the inputting column 522 into the cache memory 105 and can perform preparation of a next electronic mail or end preparation of an electronic mail.

If the mail preparation ion 511 is selected on the initial screen shown in FIG. 3, then preparation of an electronic mail, transmission of the prepared electronic mail and storage of the prepared electronic mail can be performed. If the transmission list icon 512 is selected by the user on the initial screen for processing of an electronic mail shown in FIG. 3, then the control section 100 of the television receiver produces a prepared electronic list (transmission list) which is a table of prepared electronic mails stored in the cache memory 105 already and controls the LCD unit 8 to display the electronic mail list so that an object prepared electronic mail can be selected from within the electronic mail list and amended or transmitted.

Figure 5:
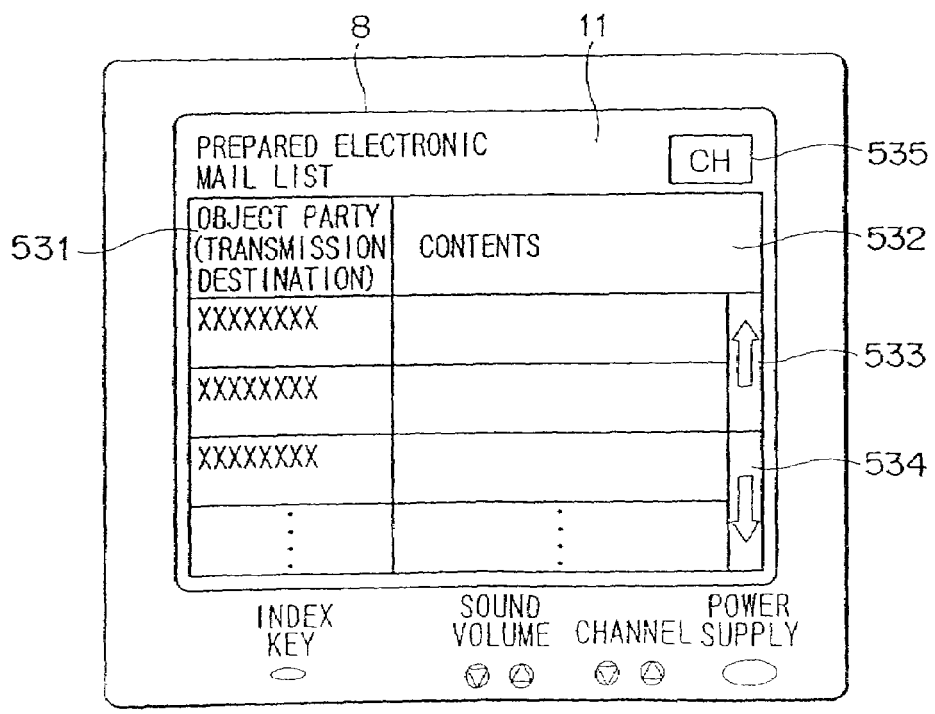
FIG. 5 is a similar view but showing a prepared electronic mail list displayed on the LCD of the television receiver of FIG. 1.

FIG. 5 shows the prepared electronic mail list used by the television receiver of the present embodiment. As described hereinabove, if the transmission list icon 512 is selected by the user on the initial screen for processing of an electronic mail, then the control section 100 of the television receiver produces a prepared electronic mail list shown in FIG. 5 based on the prepared electronic mails stored in the cache memory 105 and displays the prepared electronic mail list on the LCD unit 8. As shown in FIG. 5, the prepared electronic mail list used in the television receiver of the present embodiment has a object party (transmission destination) column 531 for a mail address, a name or the like, and a contents column 532 for indicating, for example, the top 2 or 3 rows of an electronic mail text of a prepared electronic mail.

In the prepared electronic mail list, a upward scroll icon 533 and a downward scroll icon 534 are provided as seen in FIG. 5. If the user touches a portion of the touch panel 11 corresponding to the displayed position of the upward scroll icon 533 or the downward scroll icon 534 with its finger or a touch pen, then the control section 100 of the television receiver detects the touched position of the touch panel 11 and scrolls the prepared electronic mail list upwardly or downwardly. Consequently, all of the prepared electronic mails stored in the cache memory 105 can be displayed in a list.

If an object prepared electronic mail to be amended or transmitted is found out, then the user will touch a portion of the touch panel 11 corresponding to the displaying row (displaying position) of the object prepared electronic mail with its finger or the touch pen. The control section 100 of the television receiver detects the touched position of the touch panel 11 and displays the selected prepared electronic mail on the electronic mail preparation screen shown in FIG. 4 so that the electronic mail can be amended or transmitted to a mail box of the object party as described hereinabove.

In the present embodiment, a CH icon 535 which is a setting key to a channel is provided on the display screen for the prepared electronic mail list. If the CH icon 535 is selectively operated on the display screen for the prepared electronic mail list, then the control section 100 refers to the channel setting information of the EEPROM 104 to detect a free channel number. Then, the control section 100 stores the detected free channel number and program-relating information such as a program name of a display program for a prepared transmission list to be used for execution of the display program in a coordinated relationship with each other as channel setting information into the EEPROM 104. Consequently, when the channel is selected, such a prepared electronic mail list as shown in FIG. 5 is displayed without performing any other operation so that amendment to or transmission of a prepared electronic mail can be performed. It is to be noted that, if it is tried to transmit an electronic mail but the television receiver fails in connection of a telephone circuit to an object ISP, then the television receiver of the present embodiment returns to the display of the prepared electronic mail list so that it can accept an input of a selection or transmission instruction again.

In this manner, if the transmission list icon 512 is selected on the initial screen shown in FIG. 3, then an object electronic mail can be selected from among prepared electronic mails stored in the cache memory 105 and amended or transmitted. Further, a channel number and program-relating information for execution of the display program for the prepared transmission list can be stored in a coordinated relationship as channel setting information into the EEPROM 104. If the user selects the reception list icon 513 on the initial screen for electronic mail processing shown in FIG. 3, then the control section 100 produces a reception electronic mail list shown in FIG. 6 based on received electronic mails stored in the cache memory 105 and displays it on the LCD unit 8.

Figure 6:
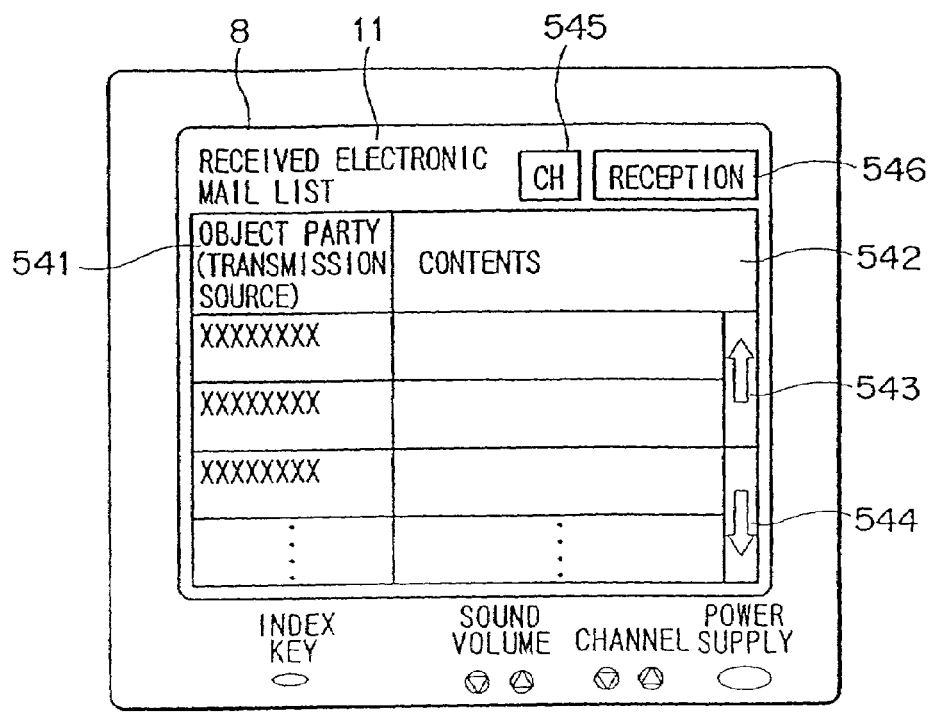
FIG. 6 is a similar view but showing a received electronic mail list displayed on the LCD of the television receiver of FIG. 1.

Referring to FIG. 6, the reception electronic mail list used in the television receiver of the present embodiment has a configuration much similar to the prepared electronic mail list shown in FIG. 5. Naturally, however, while the prepared electronic mail list described hereinabove with reference to FIG. 5 deals with an electronic mail or mails to be transmitted from the television receiver, the reception electronic mail list shown in FIG. 6 deals with an electronic mail or mails received by the television receiver. As shown in FIG. 6, the reception electronic mail list has an object party (transmission source) display column 541 for a mail address or a name, and a contents column 542 for displaying, for example, the top 2 or 3 rows of the electronic mail text of a received electronic mail.

Also in the reception electronic mail list, an upward scroll icon 543 and a downward scroll icon 544 are provided as seen in FIG. 6. If the user touches a portion of the touch panel 11 corresponding to the displayed position of the upward scroll icon 543 or the downward scroll icon 544 with its finger or the touch pen, then the control section 100 of the television receiver detects the touched position of the touch panel 11 and scrolls the reception electronic mail list upwardly or downwardly. Consequently, all of the reception electronic mails stored in the cache memory 105 can be displayed in a list. If an object received electronic mail to be displayed and read is found out, then the user will touch a portion of the touch panel 11 corresponding to the displaying position of the object received electronic mail with its finger or the touch pen. The control section 100 of the television receiver detects the touched position of the touch panel 11 and displays the selected received electronic mail on an electronic mail display screen as shown in FIG. 7 so that the electronic mail can be displayed and read on the LCD unit 8.

Figure 7:
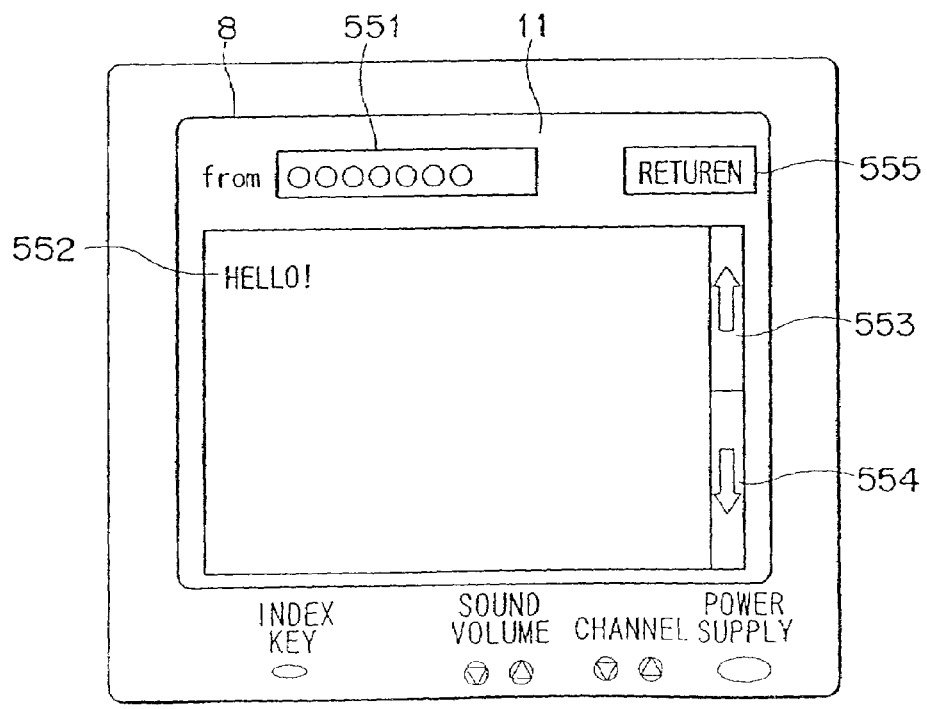
FIG. 7 is a similar view but showing a display screen of a received electronic mail displayed on the LCD of the television receiver of FIG. 1.

FIG. 7 shows a received electronic mail display screen. Referring to FIG. 7, the received electronic mail display screen has an origination source display column 551 for a mail address or a name of an origination source, and a display column 552 for an electronic mail text. In the display column 552, an upward scroll icon 553 and a downward scroll icon 554 are provided as seen in FIG. 7. If the user touches a portion of the touch panel 11 corresponding to the displayed position of the upward scroll icon 553 or the downward scroll icon 554 with its finger or the touch pen, then the control section 100 of the television receiver detects the touched position of the touch panel 11 and scrolls the electronic mail text upwardly or downwardly so that the entire electronic mail text can be displayed.

In the present embodiment, if a plurality of electronic mails destined for the user arrive, then all of the electronic mails can be fetched and successively displayed. Then, when the user completes reading of the electronic mails destined for the user itself, if the user touches a portion of the touch panel 11 corresponding to the display position of a return icon 555, which is displayed at a right upper corner portion of the received electronic mail display screen shown in FIG. 7, with its finger or the touch pen, then the display of the electronic mails destined for the user is ended. Then, in the present embodiment, the display of the received electronic mail list shown in FIG. 6 is restored. If the user touches a portion of the touch panel 11 corresponding to the displaying position of the reception icon 546 with its finger or the touch pen, then an electronic mail reception process is executed as described below. In particular, if a reception icon 546 is selected on the received electronic mail list display screen shown in FIG. 6, then the control section 100 controls the modem section 20 using the telephone number of the ISP and the personal identification number (password) of the television receiver stored in advance in the EEPROM 104 to establish connection of a telephone circuit to the object ISP.

The television receiver then transmits a request for provision of an electronic mail destined for the television receiver to request the ISP to provide an electronic mail destined for the user of the television receiver. Then, the television receiver will receive an electronic mail destined for the user provided from the ISP and store the electronic mail into the cache memory 105. Consequently, the received electronic mail received newly is added to the received electronic mail list. Then, the user will select the new received electronic mail from within the received electronic mail list shown in FIG. 6 so that it can be displayed and read on the LCD unit 8 as seen in FIG. 7. In the present embodiment, a CH icon 545 which is a setting key to a channel is provided on the received electronic mail list display screen. If the CH icon 545 is selectively operated on the received electronic mail list display screen, then the control section 100 refers to the channel setting information of the EEPROM 104 to detect a free channel number.

Then, the control section 100 stores the detected free channel number and program-relating information such as a program name to be used for execution of a reception transmission list display program in a coordinated relationship with each other as channel setting information into the EEPROM 104. Consequently, when the channel is selected, the received electronic mail list shown in FIG. 6 is displayed without performing any other operation, and the received electronic mail can be displayed and read on the LCD unit 8. If it is intended to receive an electronic mail but the television receiver fails in connection of a telephone circuit to the object ISP, then the television receiver of the present embodiment restores the display of the received electronic mail list so that it can accept selection of the reception icon again.

In this manner, if the user selects the reception list icon 513 on the initial screen shown in FIG. 3, the user can download an electronic mail or mails destined for the user from a mail box of the ISP for which the user subscribes into the television receiver and display and observe the electronic mail or mails on the LCD unit 8 of the television receiver. Further, a channel number and program-relating information to be used for execution of the reception transmission list displaying program can be stored in a coordinated relationship with each other as channel setting information into the EEPROM 104.

As described hereinabove, since activation of the browser program for establishing connection to the Internet to access information of a web page and so forth is set in a coordinated relationship with a channel, the browser program can be activated by a channel selection operation by an operation of the channel up key 322U or the channel down key 322D as described hereinabove. If connection to the Internet, that is, activation of the browser is selected by an operation of the channel up key 322U or the channel down key 322D, then the control section 100 reads out the browser program from the ROM 102 and executes the browser program to allow accessing to the Internet. In other words, the television receiver is placed into an Internet mode. If connection to the Internet, that is, activation of the browser is selected by an operation of the channel up key 322U or the channel down key 322D, then the control section 100 reads out and executes the browser program. Thus, the control section 100 controls the modem section 20 using the telephone number of the ISP and the personal identification number (password) of the television receiver itself stored in the EEPROM 104 to establish connection of a telephone circuit to the ISP as described hereinabove.

Figure 8:
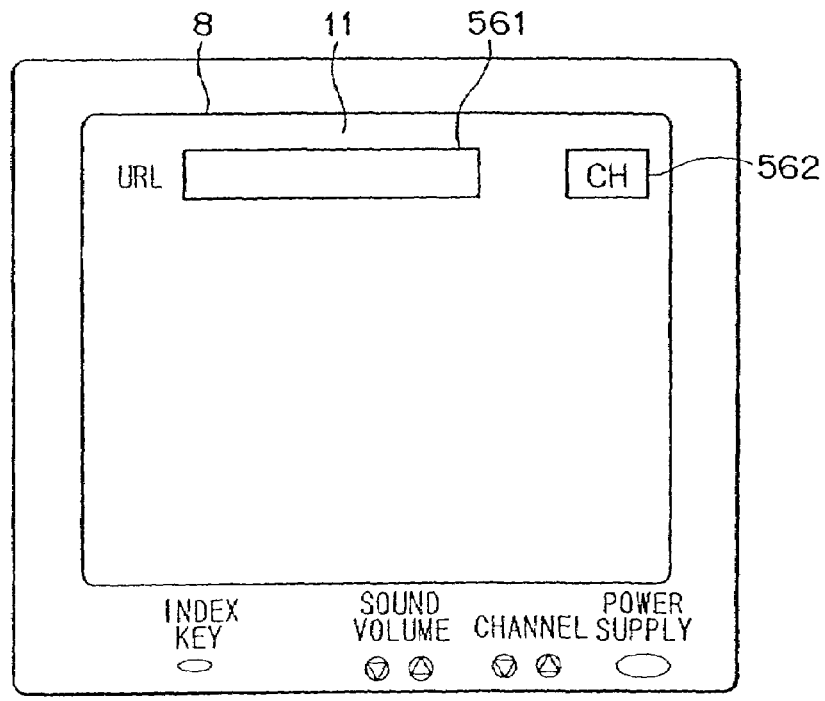
FIGS. 8 and 9 are similar views but showing display screens of a browser program displayed on the LCD of the television receiver of FIG. 1.

FIG. 8 shows a display screen of information of a web page or the like displayed on the LCD unit 8 of the television receiver after a telephone circuit is connected to the ISP in such a manner as described above. Referring to FIG. 8, the display screen of information of a web page or the like used by the television receiver of the present embodiment has a URL (Uniform Resource Locator) input column 561 and a CH icon 562 which is a setting icon to a channel. In this instance, immediately after the connection to the ISP is established, a so-called homepage of the ISP is displayed so that the user can enjoy a service provided by the ISP or perform a search for an object web page. Then, an object web page will be displayed by inputting a URL of the object web page to the URL input column 561 on the web page display screen shown in FIG. 8 or making use of a search program provided by the ISP.

Figure 9:
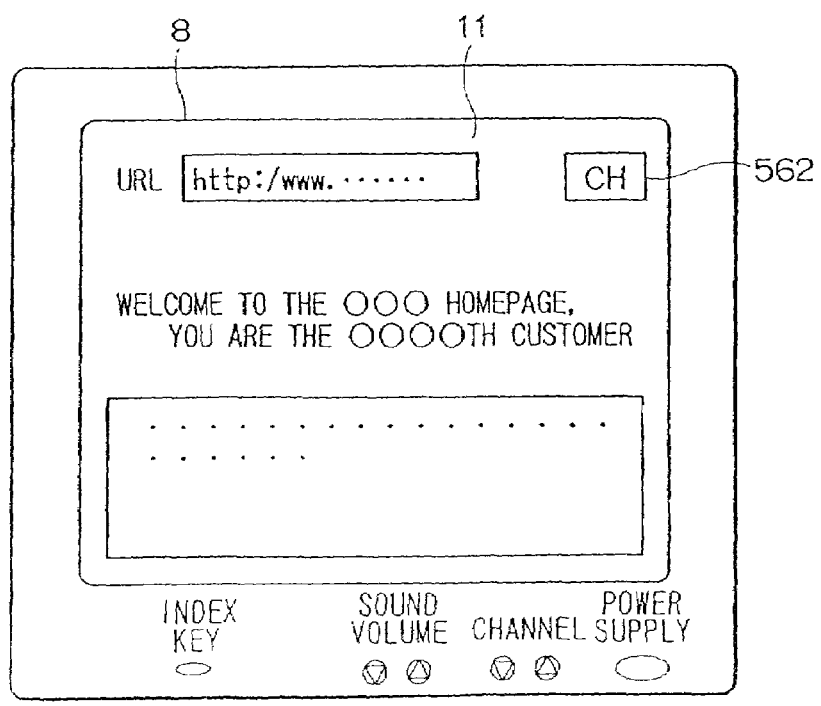

FIG. 9 shows a display screen on which an object web page is displayed. On the television receiver of the present embodiment, the web page displayed on the LCD unit 8 as shown in FIG. 9 is stored into the cache memory 105. Then, if the CH icon 562 is selectively operated on the display screen of information of a web page or the like as seen in FIG. 9, then the control section 100 refers to the channel setting information of the EEPROM 104 to detect a free channel number. The control section 100 then stores the detected free channel number and program-relating information such as the program name of the browser program, the URL of the web page and so forth to be used for execution of the browser program in a coordinated relationship with each other as channel setting information into the EEPROM 104. Consequently, when the channel is selected, the browser program is executed without performing any other operation, and the object web page is read out from the cache memory 105 so that the object web page can be displayed on the display screen of information such as a web page as seen in FIG. 9.

Where the television receiver is set such that the browser program is activated from a channel number in this manner, it is in an off-line operation mode first. Then, in order, for example, to update the displayed web page to the latest one, the user will touch, for example, a predetermined position of the display screen of the LCD unit 8, such as, for example, a position at which no selectable icon is displayed, and this operation is recognized as a connection instruction to the Internet. Consequently, the television receiver can be connected to the Internet through the modem section 20 so that it can update the web page or display another web page.

Further, the television receiver of the present embodiment includes the external memory I/F 41 as described hereinabove such that the external memory 50 can be connected to the television receiver through the external memory I/F 41 so that various kinds of information can be stored into the external memory 50 or information stored in the external memory 50 can be read out and utilized by the television receiver. The television receiver can store a web page or an electronic mail received through the modem section 20 or an electronic mail prepared on the television receiver into the external memory 50. Further, the television receiver can execute an album program for reading out and playing back image data stored in the external memory 50 and displaying the image data on the LCD unit 8.

Also when the album program is executed, a CH icon which is a setting key to a channel is provided. Thus, the television receiver can set a program name for executing the album program in a coordinated relationship with a free channel number by selectively operating the CH icon.

FIG. 10 illustrates the channel setting information table formed in the EEPROM 104 by storing a channel number and information coordinated with the channel number when a presetting process of a channel is performed or when a CH icon which is a setting key to a channel is selectively operated as described hereinabove. In the television receiver, the channel numbers from 1 to 12 are used in a coordinated relationship with frequency information for selecting an object broadcasting wave from a broadcasting station, and one (the input terminals Vd1 and Au1) of the two systems of external input terminals is coordinated with the channel number 13 while the other (input terminals Vd2 and Au2) of the two systems of external input terminals is coordinated with the channel number 14.

Further, in the television receiver, the channel numbers 15 et seq. are allocated for execution of programs which can be executed on the television receiver such as the browser program, the program for an electronic mail and other necessary programs. More particularly, in the television receiver of the present embodiment, a program name of a program to be executed is set to the channel number 15 as seen in FIG. 10. In this instance, the program to be executed is the browser. Thus, if the browser is activated, then the user of the television receiver can input its URL and access an object web page.

A program name of another program to be executed is set to the channel number 16. In this instance, the program to be executed is the electronic mail preparation program. Thus, the television receiver can execute the electronic mail preparation program to prepare an electronic mail. In the television receiver of the present embodiment, a program name to be executed and a URL of a web page are set to the channel number 17 as seen in FIG. 10. In this instance, the program to be executed is the browser, and the URL of the web page to be displayed through the browser is URL1. A program name of a program to be executed and a URL of a web page are set to the channel number 18. In this instance, the program to be executed is the browser, and the URL of the web page to be displayed through the browser is URL2.

A program name of a program to be executed is set to the channel number 19. In this instance, the program to be executed is the display program for the reception list, that is, the received electronic mail list. Thus, when the channel number 19 is selected, the television receiver displays the received electronic mail list shown in FIG. 6 and can receive an electronic mail and display the received electronic mail. A program name of a program to be executed is set to the channel number 20. In this instance, the program to be executed is the display program for the transmission list, that is, the prepared electronic mail list. Thus, when the channel number 20 is selected, the television receiver displays the prepared electronic mail list shown in FIG. 5 and can amend or transmit a prepared electronic mail.

It is to be noted that FLG (flag) in the channel setting information table illustrated in FIG. 10 represents information for making it possible for the control section 100 of the television receiver to discriminate rapidly whether a selected channel number is for selection of a television broadcasting wave, for selection of an external input terminal or for execution of a program. In the present embodiment, as seen in FIG. 10, FLG "0" is used to indicate selection of a television broadcasting wave; FLG "1" is used to indicate selection of an external input terminal; and FLG "2" is used to indicate selection of execution of a program.

FIG. 11 illustrates processing performed in response to a selective input of a channel number on the television receiver of the present embodiment. Each time the channel up key 322U or the channel down key 322D is operated, the television receiver can successively change a broadcasting wave to be selected, accept a signal from an external input terminal, execute the browser program, execute the display program for the received electronic mail list, execute the display program for the prepared electronic mail list or execute the album program. By an operation of the channel up key 322U or the channel down key 322D which is an operation very familiar to the user, the television receiver can not only switch the channel but also switch the signal to be processed so as to accept a signal from an external input terminal or execute various programs.

Now, processing of the television receiver of the present embodiment executed in response to an operation input of a channel number by the user is described with reference to a flow chart of FIG. 12. The processing illustrated in FIG. 12 is executed by the control section 100 of the television receiver when the power supply to the television receiver is made available.

Figure 12:
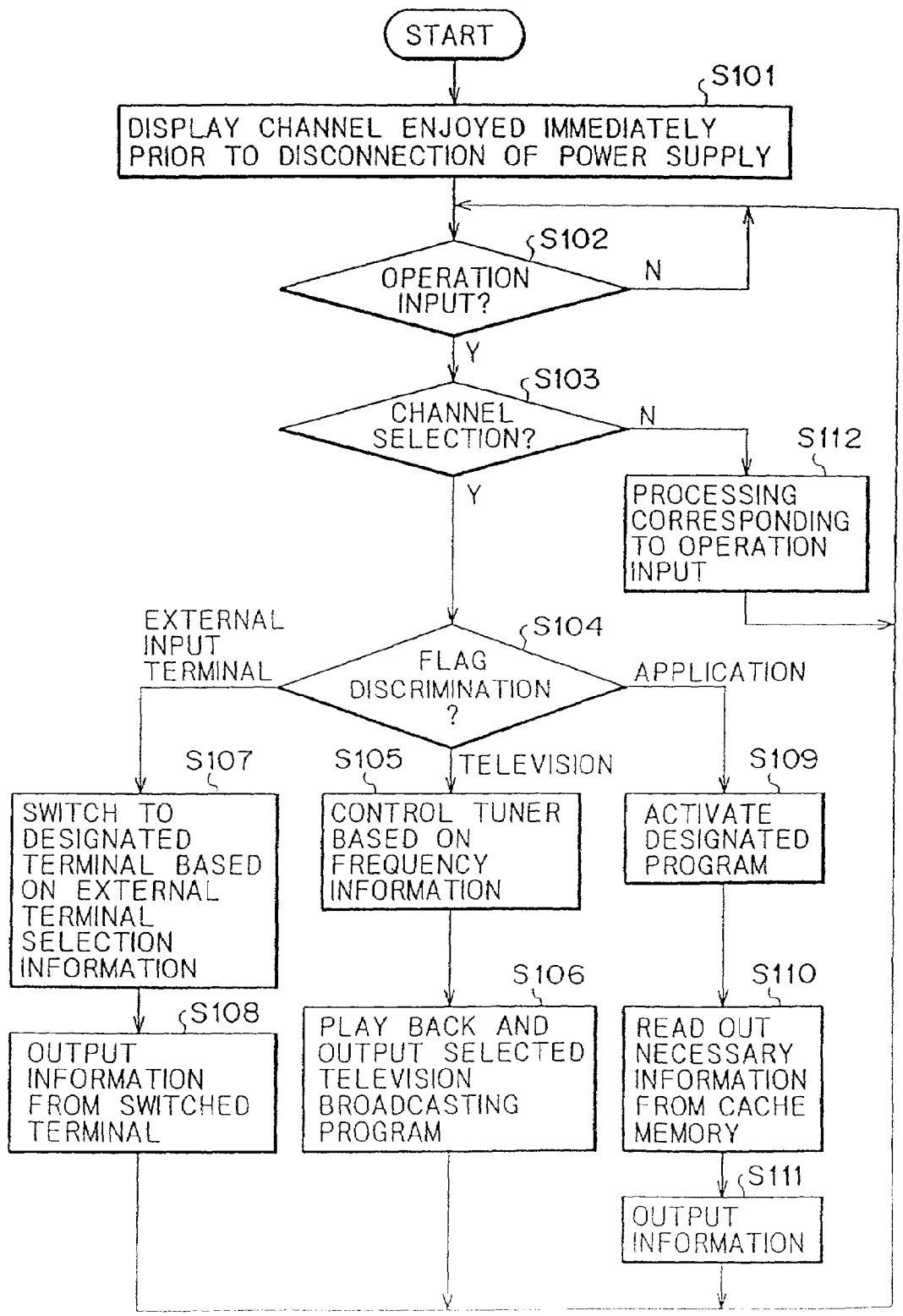
FIG. 12 is a flow chart illustrating a process executed by the television receiver shown in FIG.1.

When the power supply is made available to the television receiver, the control section 100 starts execution of the processing illustrated in FIG. 12. In particular, the control section 100 first uses its last channel memory function to execute a process for the channel which was selected when the power supply was disconnected last (step S101). For example, if a television broadcast program was enjoyed on the television receiver last, then the broadcasting wave of a broadcasting station coordinated with the channel number is selectively received so that it can be enjoyed on the television receiver. Then, the control section 100 discriminates whether or not an operation input from a user is accepted (step S102). If it is discriminated in step S102 that no operation input from a user is accepted, then the control section 100 repeats the processing in step S102 to wait for an operation input from a user.

If it is discriminated in step S102 that an operation input from a user is accepted, then the control section 100 discriminates whether or not the accepted operation input is a selection input of a channel performed for the channel up key 322U or the channel down key 322D (step S103).

If it is discriminated in step S102 that the accepted operation input is not a selection input of a channel, then the control section 100 executes processing corresponding to the operation input such as, for example, adjustment of the sound volume or switching of the mode (step S112). Thereafter, the control section 100 returns its processing to step S102, in which it waits for a new selective operation. On the other hand, if it is discriminated in step S103 that a selective input of a channel is accepted, then the control section 100 reads out, based on the selected channel, the pertaining channel setting information and discriminates, based on the FLG information of the setting information, with what information the channel is coordinated (step S104).

If it is discriminated in step S104 that the flag of the selected channel number is "0" and consequently the information coordinated with the selected channel number is frequency information for selecting a broadcasting wave, then the control section 100 forms a channel selection control signal based on the frequency information coordinated with the channel number and supplies the channel selection control signal to the tuner section 2 to change the selected channel of the tuner section 2 (step S105). Consequently, the selected channel by the tuner section 2 is switched, and the tuner section 2 plays back and outputs a broadcasting program provided by the newly selected television broadcasting wave (step S106). Thereafter, the control section 100 returns its processing to step S102 to accept a new operation input.

On the other hand, if it is discriminated in step S104 that the flag of the selected channel number is "1" and therefore the information coordinated with the selected channel number is selection information of an external input terminal, then the control section 100 controls the selector 5 based on the selection information of an external input terminal coordinated with the channel number (step S107). Consequently, the control section 100 controls the selector 5 to output a signal from the selected external input terminal (step S108). Consequently, a video or sound based on a signal supplied from the selected external input terminal can be played back and outputted. Thereafter, the control section 100 returns its processing to step S102 to accept a new operation input.

Further, if it is discriminated in step S104 that the flag of the selected channel number is "2" and therefore the information coordinated with the selected channel number is program-relating information regarding a program to be executed, then the control section 100 executes (activates) the designated program based on the program-relating information coordinated with the selected channel number (step S109) and reads out necessary information from the cache memory 105 or the external memory 50 (step S110). Then, the control section 100 performs such processing as to display a web page, a received electronic mail or a prepared electronic mail or display an image corresponding to image data stored in the external memory 50 based on the information read out from the cache memory 105 (step S111). Thereafter, the control section 100 returns its processing to step S102 to accept a new operation input.

In this manner, in the television receiver of the present embodiment, only by operating the channel up key/down key without performing any other special operation, it is possible to process a signal from an external input terminal or execute a program for execution of an object process in a similar manner as in switching of a broadcasting wave to be selected. The television receiver of the present embodiment further has a function called resume function by which, when it executes a program in response to a selective input of a channel number, it can continue its processing from an intermediate portion of the program if the processing of the program is interrupted in response to a change of the channel number. For example, even if a channel number is switched during preparation of an electronic mail, if the channel number is switched back to the channel number coordinated with the electronic mail preparation program, then the television receiver displays a screen same as that prior to the first switching of the channel number, that is, the electronic mail preparation screen. Consequently, the preparation of the electronic mail being prepared can be continued.

Similarly, even if a channel number is switched during enjoyment of a web page, if the channel number is switched back to the channel number coordinated with the web page, then the television receiver displays a screen same as that prior to the first switching of the channel number, that is, the web page which was displayed upon switching of the channel number. Consequently, the interrupted processing can be resumed and continued by a simple operation of selection of a channel number without performing any other complicated operation. Such a resume function as described above can be realized by storing and keeping various kinds of information upon interruption caused by a change of the channel number or the like into and in the EEPROM 104 in a coordinated relationship with an object program.

Figure 13:
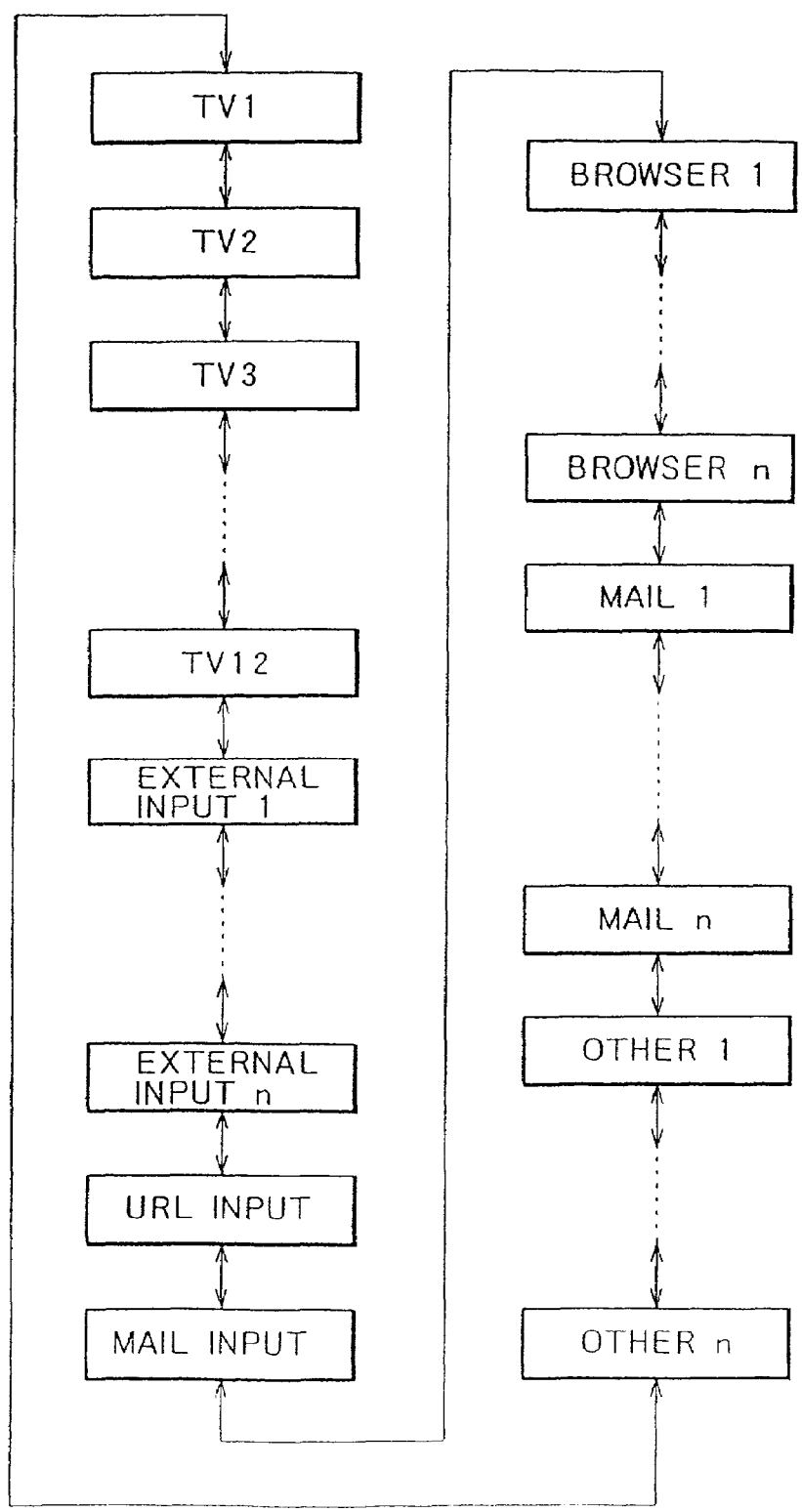
FIG. 13 is a flow diagram illustrating a different rotation of selection channels which can be performed on the television receiver shown in FIG. 1.

It is to be noted that, while the television receiver of the present embodiment uses the channel numbers from 1 to 21 as seen FIGS. 10 and 11, the channel numbers to be used are not limited to them. Further, for example, as seen in FIG. 13, any number of channels from 1 to n may be used for external inputs, browsers, electronic mails and other programs. Further, in the television receiver of the present embodiment, since the control section 100 searches for a free channel and uses the searched out free channel, it can set various kinds of information for allocating object functions to be executed to successive channel numbers while preventing free channels from appearing intermittently. Accordingly, even if the channel up key or the channel down key is used, information can be selected and processed smoothly.

Naturally, it is otherwise possible to configure the television receiver such that channel numbers to be used are selected by a user and program-relating information for executing an object program is set to each of such channel numbers. Further, the television receiver of the present embodiment can display channel setting information illustrated in FIG. 10 set to the EEPROM 104 in a table as described hereinabove. To this end, the television receiver includes the index key (index button switch) 324 provided on the key operation section 32 as shown in FIG. 2. If the index key 324 is operated, then the channel table is displayed. In particular, if an instruction to display the channel table is inputted by the user, then the control section 100 forms information for displaying the channel table based on the channel setting information set to the EEPROM 104 and supplies the formed information to the OSD processing section 6.

The OSD processing section 6 forms a video signal for displaying the channel table based on the information received from the control section 100 and supplies the video signal to the video signal processing section 7. Consequently, a channel table is formed in accordance with the channel setting information set in the EEPROM 104 and displayed on the display screen of the LCD unit 8.

Figure 14:
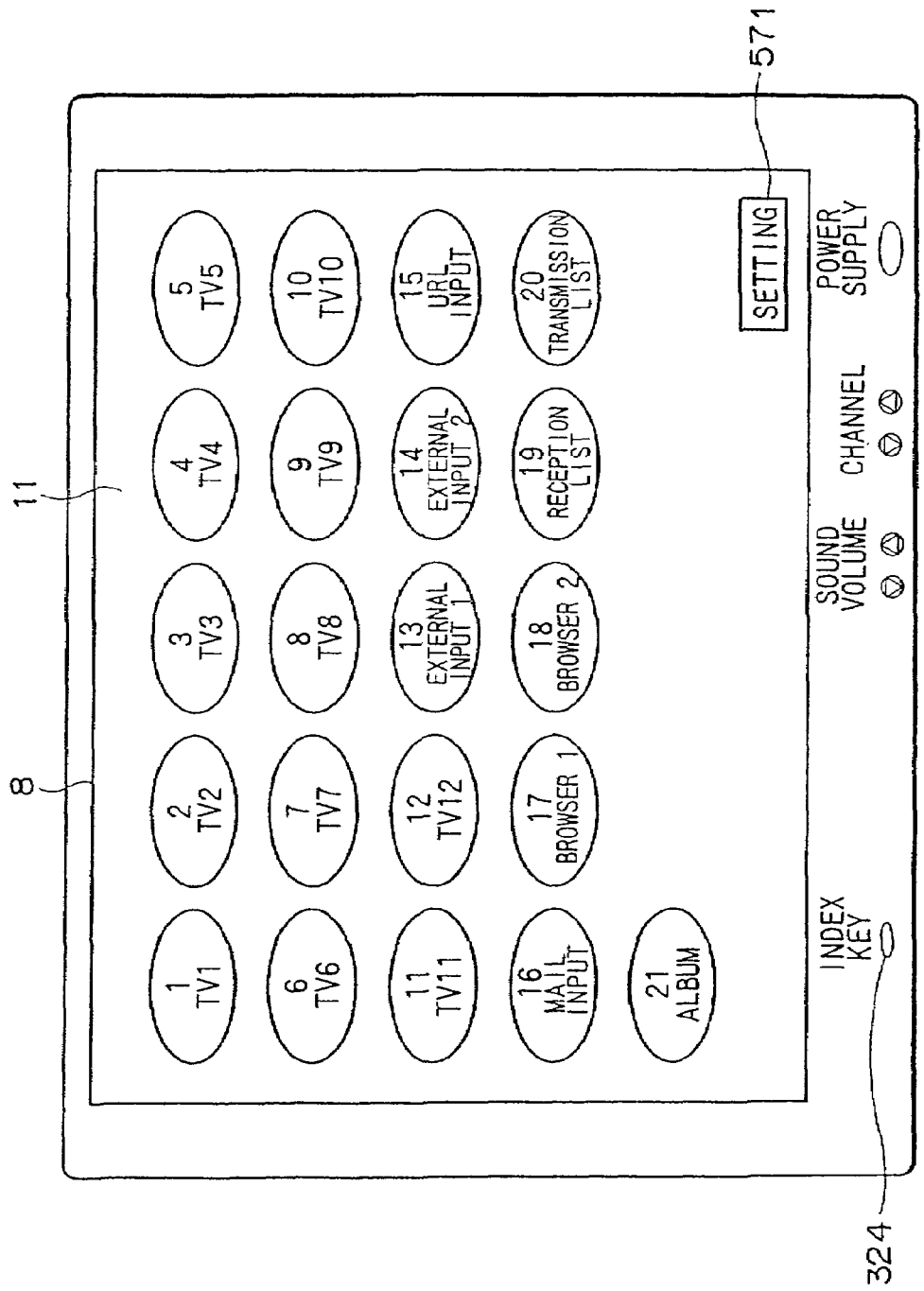
FIG. 14 is a schematic view showing an example of display of a channel table.

FIG. 14 shows an example of channel table displayed as a GUI (Graphical User Interface) on the LCD unit 8. Referring to FIG. 14, an icon including a channel number and identification information of information set to the channel number is displayed for each channel number. In FIG. 14, it is shown that selection information of television broadcasting waves is set to the channel numbers 1 to 12, and selection information of the external input terminals is set to the channel numbers 13 and 14. Further, information for executing the browser is set to the channel number 15, and information for execution of the program for preparation of an electronic mail is set to the channel number 16. Further, it is shown that information for executing the browser is set to the channel numbers 17 and 18; information for executing the program regarding an electronic mail is set to the channel numbers 19 and 20, and information for executing the album program for displaying image information from the external memory 50 is set to the channel number 21.

From the display of such a channel table as described above, the user can recognize up to what channel number information is set already. Thus, the user can select an object channel rapidly. Further, in the television receiver of the present embodiment, if the user touches a portion of the touch panel 11 at a position at which the icon of an object channel is displayed with its finger or the like, then the touched position is detected by the coordinate detection section 12 and conveyed to the control section 100. Consequently, the control section 100 discriminates the touched position by the user and the icon displayed in the display area of the display screen of the LCD unit 8 corresponding to the touched position, and can select an object channel number of the user.

Then, the control section 100 can perform a process corresponding to the selected channel number as described hereinabove with reference to the flow chart of FIG. 12. In this instance, the user need not perform a plurality of operations before an object channel number is selected like a case wherein the channel up key or the channel down key is used, but can select an object channel number by a single operation. Consequently, selective inputting of a channel number can be performed rapidly and accurately. It seems likely that the channel table cannot be displayed on one screen like the case shown in FIG. 14. In the example shown in FIG. 14, if the number of channel numbers is greater by four, then the channel table cannot be displayed fully on one screen. Therefore, where a great number of channel numbers are to be used, the channel table is displayed over a plurality of screens (pages) so as to allow use of such great number of channel numbers.

Further, a setting icon 571 is displayed on the channel table shown in FIG. 14. If the setting icon 571 is selected, then various settings such as setting of a channel regarding a television broadcast, setting regarding an external input terminal, setting of a channel regarding the Internet and setting of a channel regarding an electronic mail can be performed. It is to be noted that, while, in the present embodiment described above, principally frequency information for selection of a television broadcasting wave, information for execution of the browser program or information for execution of a program relating to an electronic mail are set in a coordinated relationship with a channel number, the information to be coordinated with a channel number is not limited to such specific information as mentioned above.

For example, it is possible to coordinate a program for displaying the electronic mail preparation screen described hereinabove with reference to FIG. 4 with a channel number in such a manner as in setting in a coordinated relationship with the channel number 16 in FIG. 10 such that, based on the channel number, the electronic mail preparation screen is displayed to perform preparation of an electronic mail immediately, continue interrupted preparation of an electronic mail or display a predetermined prepared electronic mail so as to be read, amended or transmitted.

Also it is possible to similarly coordinate a program for displaying the display screen for an electronic mail described hereinabove with reference to FIG. 7 with a channel number such that, based on the channel number, the display screen for an electronic mail is displayed to display a predetermined received electronic mail. Where the television receiver is configured in this manner, for example, a CH key for coordinating a program with a channel number may be provided on the screen. In particular, in the embodiment described above, the CH key which is an icon for coordinating a program to be executed with a channel corresponds to a book mark key or a favorite key of the browser program or corresponds to a production key for a holder for storing a prepared electronic mail or a received electronic mail.

Accordingly, a web page set to a channel using the CH key can be handled as a book marked object in the browser program, and also it is possible to designate a folder set to a channel using the CH key and display and observe information in the folder. Further, it is possible to set a program for processing information of various folders produced in a memory of the television receiver and various executable programs such as a word processing program (word processing software), a spreadsheet program and a game program (game software) in a coordinated relationship with channel numbers. In this instance, various programs can be rendered operative and utilized readily only by a channel up/down operation which is very similar to anyone.

Further, it is possible to set various functions which can be executed on the television receiver in a coordinated relationship with channel numbers so that a desired function is executed by selection of a channel number. Also it is described above that the television receiver of the embodiment described above includes the LCD unit 8 as a display element and the touch panel serving as touched position detection device is adhered to the display screen of the LCD unit 8. However, the display element is not limited to this.

The display element may be a CRT (cathode ray tube) display unit. Further, whether the display element is an LCD or a CRT display unit, a touch panel need not necessarily be provided. Where no touch panel is used, a channel up/down key provided on a remote controller, a hardware key provided on the television receiver or a keyboard connected to the television receiver may be operated in a similar manner as in the television receiver of the embodiment described above so that a process coordinated with a selected channel number may be executed. Further, while, in the embodiment described above, the present invention is applied to a television receiver, the application of the present invention is not limited to the television receiver. For example, the present invention can be applied to a receiver which does not include a display element such as the video signal processing section 7 or the LCD unit 8 or the audio signal amplification section 9 or the like. In other words, the present invention can be applied to a receiver which not only selects a broadcasting program in accordance with a channel number but also coordinates information of processing programs to be executed with different channels so that an object program is executed in accordance with a channel number.

Further, a program to be executed by such a television receiver or a receiver as described above may be stored, in addition to a memory such as a ROM of the television receiver or the receiver, into an external memory, a hard disk or the like which can be connected to the television receiver or the receiver such that the program stored in the external memory or the hard disk is read out to and executed by a control section.

Further, while, in the embodiment described above, a telephone number of an ISP or a personal identification number is stored into the EEPROM 104, it may otherwise be set to the channel setting information table. In other words, various kinds of information necessary for execution of an object process or program can be set to the channel setting information table. Further, while, in the embodiment described above, the tuner section of the television receiver receives an analog television broadcasting signal of a ground wave, the television broadcasting signal is not limited to this. The present invention can be applied also to a television receiver which has a function of receiving and selecting a digital satellite broadcast or a digital/analog broadcast or a receiver for reception of a satellite broadcast called STB or IRD.

When a digital satellite broadcast is to be received, since one broadcasting signal has program data of a plurality of broadcasting programs multiplexed therein, as broadcasting program selection information to be used for selection of a broadcasting program, not frequency information but also necessary information such as, for example, information for indicating a transponder is used. As the broadcasting program selection information to be coordinated with a channel number in this manner, not only frequency information but also various kinds of information necessary to select an object broadcasting program can be used.

Furthermore, while, in the embodiment described above, the channel number is switched by an operation of the channel up key or down key, such switching is not limited to this. A program or a function which can be executed may be switched like a television function→external input→internet function→electronic mail function, for example, using a function key or some other operation key provided on the television receiver body or a remote controller.

In other words, not the channel up key or down key but any of various operation keys provided on a television receiver or a remote controller for a television receiver may be used to select a program or a function which can be executed. Naturally, however, an operation key for exclusive use for selecting a program or a function which can be executed is provided alternatively.

While a preferred embodiment of the present invention has been described using specific terms, such description is for illustrative purposes only, and it is to be understood that changes and variations may be made without departing from the spirit or scope of the following claims.

What is claimed is:

1. A television receiver, comprising:
a selector for receiving television broadcasting signals, wherein the selector selects one of the television broadcasting signals;
a display element for displaying a video based on a video signal of the television broadcasting signal selected by said selector;
a storage device for storing program selection information to be used to control said selector and channel numbers in a coordinated relationship and storing program-related information,
said program-related information used for execution of object processing programs and the channel numbers in a coordinated relationship;
an acceptance device for accepting a selective input of a channel number from a user;
a readout device for reading out information corresponding to the channel number accepted by said acceptance device from said storage device;
an index key for assisting the user to choose a channel by causing the display element to display an index table showing information of each channel;
a selection control device for controlling, when the information read out by said readout device is the program selection information, said selector based on the program selection information; and
a program execution device for executing, when the information read out by said readout device is the program-related information, a program in response to the program-related information;
wherein the television receiver is adapted to specify one or more channels associated with:
a predetermined ISP;
a processing program for preparation, transmission or reception of electronic mail;
a transmission list that pertains to electronic mail to be transmitted;
a reception list of electronic mails; and
one or more accessed web pages;
wherein when a channel associated with one or more accessed web pages is selected, the most recently viewed portion of the associated one or more accessed web pages is displayed in an off-line mode first and then is updated according to a user's operation,
wherein when a program is not associated with a channel and an icon displayed on a display screen that displays the program is operated, a control means detects a free channel and associates the free channel with the program by storing the free channel number and program-relating information of the program as channel setting information,
wherein information used upon connection to a network is set to a first information setting table separate from a second information table containing channel setting information,
wherein said selection control device, upon changing of a channel, executes a program associated with said channel, and
wherein a FLG is used to indicate whether a channel number is for selection of a television broadcasting signal or for selection of a program-related information or for selection of an external input terminal.

2. The television receiver according to claim 1, wherein said acceptance device includes channel up/down keys for accepting selective inputs of the channel number in forward and reverse directions, respectively.

3. The television receiver according to claim 1, wherein the program-related information coordinated with at least one of the channel numbers relates to a processing program which can be executed by said television receiver.

4. The television receiver according to claim 1, further comprising:
a communication device for connecting said television receiver to a communication network,
wherein the program-related information coordinated with at least one of the channel numbers relates to a program to be executed to allow at least said television receiver to transmit or receive information through said communication device.

5. The television receiver according to claim 1, further comprising:
a communication device for connecting said television receiver to a communication network, and
a received information storage device for storing received information received through said communication device, wherein the program-related information coordinated with at least one of the channel numbers relates to a program to be executed to cause at least display information of the received information stored in said received information storage device to be displayed on said display element.

6. The television receiver according to claim 1, further comprising:
   a communication device for connecting said television receiver to a communication network, and
   a transmission information storage device for storing transmission information to be transmitted through said communication device,
   wherein the program-related information coordinated with at least one of the channel numbers relates to a program to be executed to cause at least display information of the transmission information stored in said transmission information storage device to be displayed on said display element.

7. The television receiver according to claim 1, further comprising:
   a display information storage device for storing display information to be displayed on said display element,
   wherein the program-related information coordinated with at least one of the channel numbers relates to a program to be executed to cause at least a video corresponding to the display information stored in said display information storage device to be displayed on said display element.

8. The television receiver according to claim 1, further comprising:
   an instruction input acceptance device for accepting a display instruction input of a list of the information stored in said storage device; and
   a list display signal formation device for forming, when an instruction to display the list is accepted by said instruction input acceptance device, a displaying signal for displaying the list of the information stored in said storage device on said display element.

9. The television receiver according to claim 8, further comprising:
   a touched position detection device provided on a display screen of said display element for detecting a touched position of said display screen touched by a user,
   wherein said readout device uses a channel number corresponding to a display item of the list displayed at the touched position of said display screen detected by said touched position detection device as a channel number selected by the user.

10. A television receiver according to claim 1, wherein said program execution device executes the program from a process which was being executed upon switching from a channel number to which the program is allocated to another channel number.

11. A receiver, comprising:
    a selector for receiving broadcasted signals and selecting one of the broadcasted signals;
    a signal outputting device for outputting a displaying signal of the broadcasted signal selected by said selector;
    a storage device for storing program selection information to be used to control said selector and channel numbers in a coordinated relationship and storing program-related information to be used for execution of object processing programs and the channel numbers in a coordinated relationship;
    an acceptance device for accepting a selective input of a channel number from a user;
    a readout device for reading out information corresponding to the channel number accepted by said acceptance device from said storage device;
    an index key for assisting the user to choose a channel by causing the display element to display an index table showing information of each channel;
    a selection control device for controlling, when the information read out by said readout device is the program selection information, said selector based on the program selection information; and
    a program execution device for executing, when the information read out by said readout device is the program-related information, a program in response to the program-related information;
    wherein the television receiver is adapted to specify one or more channels associated with:
      a predetermined ISP;
      a processing program for preparation, transmission or reception of electronic mail;
      a transmission list that pertains to electronic mail to be transmitted;
      a reception list of electronic mails; and
      one or more accessed web pages;
    wherein when a channel associated with one or more accessed web pages is selected, the most recently viewed portion of the associated one or more accessed web pages is displayed in an off-line mode first and then is updated according to a user's operation,
    wherein when a program is not associated with a channel and an icon displayed on a display screen that displays the program is operated, a control means detects a free channel and associates the free channel with the program by storing the free channel number and program-relating information of the program as channel setting information,
    wherein information used upon connection to a network is set to a first information setting table separate from a second information table containing channel setting information,
    wherein said selection control device, upon changing of a channel, executes a program associated with said channel, and
    wherein a FLG is used to indicate whether a channel number is for selection of a television broadcasting signal or for selection of a program-related information or for selection of an external input terminal.

12. The receiver according to claim 11, wherein said acceptance device includes channel up/down keys for accepting selective inputs of the channel number in forward and reverse directions, respectively.

13. The receiver according to claim 11, wherein the program-related information coordinated with at least one of the channel numbers relates to a processing program which can be executed by said receiver.

14. The receiver according to claim 11, further comprising:
    a communication device for connecting said receiver to a communication network,
    wherein the program-related information coordinated with at least one of the channel numbers relates to a program to be executed to allow at least said receiver to transmit or receive information through said communication device.

15. The receiver according to claim 11, further comprising:
    a communication device for connecting said receiver to a communication network;

a received information storage device for storing received information received through said communication device, and wherein the program-related information coordinated with at least one of the channel numbers relates to a program to be executed to cause a displaying signal corresponding to at least display information of the received information stored in said received information storage devices to be outputted from said signal outputting device.

16. The receiver according to claim 11, further comprising:

a communication device for connecting said receiver to a communication network; and a transmission information storage device for storing transmission information to be transmitted through said communication device, wherein the program-related information coordinated with at least one of the channel numbers relates to a program to be executed to cause a displaying signal corresponding to at least display information of the transmission information stored in said transmission information storage device to be outputted from said signal outputting device.

17. The receiver according to claim 11, further comprising:

a display information storage device for storing display information to be displayed on a display element, wherein the program-related information coordinated with at least one of the channel numbers relates to a program for causing a displaying signal at least corresponding to the display information stored in said display information storage device to be outputted from said outputting device.

18. The receiver according to claim 11, further comprising:

an instruction input acceptance device for accepting a display instruction input of a list of the information stored in said storage device; and a list display signal formation device for forming, when an instruction to display the list is accepted by said instruction input acceptance device, a displaying signal for displaying the list of the information stored in said storage device and allowing the displaying signal to be outputted from said signal outputting device.

19. The receiver according to claim 11, wherein said program execution device executes the program from a process which was being executed upon switching from a channel number to which the program is allocated to another channel number.

20. A computer-readable medium storing an executable program, when executed, causing an electronic apparatus to process signals according to the program, said program comprising the steps of:

storing program selection information to be used to control channel selection and channel numbers in a coordinated relationship and program-related information to be used for execution of object processing programs and the channel numbers being stored in a coordinated relationship in a predetermined memory of said electronic apparatus;

accepting a selective input of a channel number from a user;

reading out information corresponding to the channel number accepted in the acceptance step from said predetermined memory;

assisting the user to choose a channel by causing the display element to display an index table showing information of each channel;

controlling, when the information read out in the readout step is the program selection information, the channel selection based on the program selection information; and executing, when the information read out in the readout step is the program-related information, a program in response to the program-related information;

wherein the predetermined memory includes a table adapted to specify one or more channels associated with:
 a predetermined ISP;
 a processing program for preparation, transmission or reception of electronic mail;
 a transmission list pertaining to electronic mail to be transmitted;
 a reception list of electronic mails; and
 one or more accessed web pages;
 wherein when a channel associated with one or more accessed web pages is selected, the most recently viewed portion of the associated one or more accessed web pages is displayed in an off-line mode first and then is updated according to a user's operation, wherein when a program is not associated with a channel and an icon displayed on a display screen that displays the program is operated, a control means detects a free channel and associates the free channel with the program by storing the free channel number and program-relating information of the program as channel setting information, wherein information used upon connection to a network is set to a first information setting table separate from a second information table containing channel setting information, wherein said controlling step, upon changing of a channel, executes a program associated with said channel, and wherein a FLG is used to indicate whether a channel number is for selection of a television broadcasting signal or for selection of a program-related information or for selection of an external input terminal.

21. The program execution method according to claim 20, wherein, in the step of accepting, selective inputs of the channel number are accepted successively in a forward or reverse direction of the channel number.

22. The program execution method according to claim 20, wherein the program-related information coordinated with at least one of the channel numbers relates to a processing program which can be executed by said receiver.

23. The program execution method according to claim 20, wherein said electronic apparatus includes:

a communication section for connecting said electronic apparatus to a communication network, wherein the program-related information coordinated with at least one of the channel numbers relates to a program to be executed to allow at least said electronic apparatus to transmit or receive information through said communication section.

24. The program execution method according to claim 20, wherein said electronic apparatus includes:

a communication section for connecting said electronic apparatus to a communication network; and a received information memory for storing received information received through said communication section, and the program-related information coordinated with at least one of the channel numbers relates to a program to be executed to cause at least the received information stored in said received information memory to be outputted.

25. The program execution method according to claim 20, wherein said electronic apparatus includes:
- a communication section for connecting said electronic apparatus to a communication network; and
- a transmission information memory for storing transmission information to be transmitted through said communication section, and the program-related information coordinated with at least one of the channel numbers relates to a program to be executed to cause at least the transmission information stored in said transmission information memory to be outputted.

26. The program execution method according to claim 20, wherein said electronic apparatus includes:
- a display information memory for storing display information,
- wherein the program-related information coordinated with at least one of the channel numbers relates to a program to be executed to cause at least the display information stored in said display information memory to be outputted.

27. The program execution method according to claim 20, further comprising the steps of:
- accepting a display instruction input of a list of the information stored in said predetermined memory; and
- forming, when an instruction to display the list is accepted in said instruction input acceptance step, a displaying signal for displaying a list of the information stored in said memory on a display element.

28. The program execution method according to claim 27, wherein said electronic apparatus includes a display element and touched position detection device provided on a display screen of said display element for detecting a touched position of the display screen touched by a user, said program execution method further comprising:
- an operation input acceptance step of accepting an operation input from a user through said touched position detection device, a channel number which corresponds to a display item of the list displayed at the touched position of the display screen accepted in the instruction input acceptance step being used as a channel number selected by the user.

29. The program execution method according to claim 20, wherein, in the program execution step, the program is executed from a process which was being executed upon switching from a channel number to which the program is allocated to another channel number.

* * * * *